United States Patent
Yokoshi et al.

(10) Patent No.: US 7,668,556 B2
(45) Date of Patent: Feb. 23, 2010

(54) COMMUNICATION SYSTEM, COMMUNICATION TERMINAL APPARATUS AND WIRELESS KEY APPARATUS

(75) Inventors: Minoru Yokoshi, Tokyo (JP); Mitsuyoshi Yasuda, Tokyo (JP); Katsutoshi Itoh, Tokyo (JP); Makoto Natori, Saitama (JP); Osamu Yoshimura, Kanagawa (JP); Takeshi Itagaki, Tokyo (JP)

(73) Assignee: Sony Ericsson Mobile Communications Japan, Inc., Tokyo (JP)

( * ) Notice: Subject to any disclaimer, the term of this patent is extended or adjusted under 35 U.S.C. 154(b) by 709 days.

(21) Appl. No.: 11/170,564

(22) Filed: Jun. 29, 2005

(65) Prior Publication Data
US 2006/0003788 A1     Jan. 5, 2006

(30) Foreign Application Priority Data
Jun. 30, 2004    (JP)    ............................ P2004-195060

(51) Int. Cl.
    *H04W 24/00*    (2006.01)
(52) U.S. Cl. ................... 455/456.3; 455/41.2; 455/410; 455/420; 455/426.1; 455/517; 455/567; 455/574; 340/328; 340/465; 370/311
(58) Field of Classification Search ............. 455/456.3, 455/41.2, 41.3, 410, 411, 414.1, 420, 426.1, 455/462, 517, 550.1, 567, 574; 340/328, 340/465; 370/311
See application file for complete search history.

(56) References Cited

U.S. PATENT DOCUMENTS

| | | | | |
|---|---|---|---|---|
| 6,961,541 | B2 * | 11/2005 | Overy et al. | ................ 455/41.2 |
| 2004/0157559 | A1 * | 8/2004 | Sugikawa | .................. 455/41.2 |

FOREIGN PATENT DOCUMENTS

| | | |
|---|---|---|
| JP | 10 243059 | 9/1998 |
| JP | 2001 144781 | 5/2001 |
| JP | 2001 345924 | 12/2001 |
| JP | 2003 87368 | 3/2003 |

* cited by examiner

*Primary Examiner*—Matthew D Anderson
*Assistant Examiner*—Shaima Q Aminzay
(74) *Attorney, Agent, or Firm*—Frommer Lawrence & Haug LLP; William S. Frommer; Thomas F. Presson

(57) ABSTRACT

A communication system including a communication terminal apparatus and a wireless key apparatus in wireless communication is provided. The communication terminal apparatus includes a first communication unit operable to receive a first wireless signal, and a first control unit operable to determine a distance between the communication terminal apparatus and the wireless key apparatus based on the received first wireless signal, wherein the first control unit limits a predetermined function of the communication terminal apparatus based on determining the distance. The wireless key apparatus includes a second communication unit operable to receive a second wireless signal, and a second control unit operable to determine the distance between the communication terminal apparatus and the wireless key apparatus based on the received second wireless signal, whereby the second control unit decreases transmission power associated with the second communication unit based on the determined distance.

16 Claims, 20 Drawing Sheets

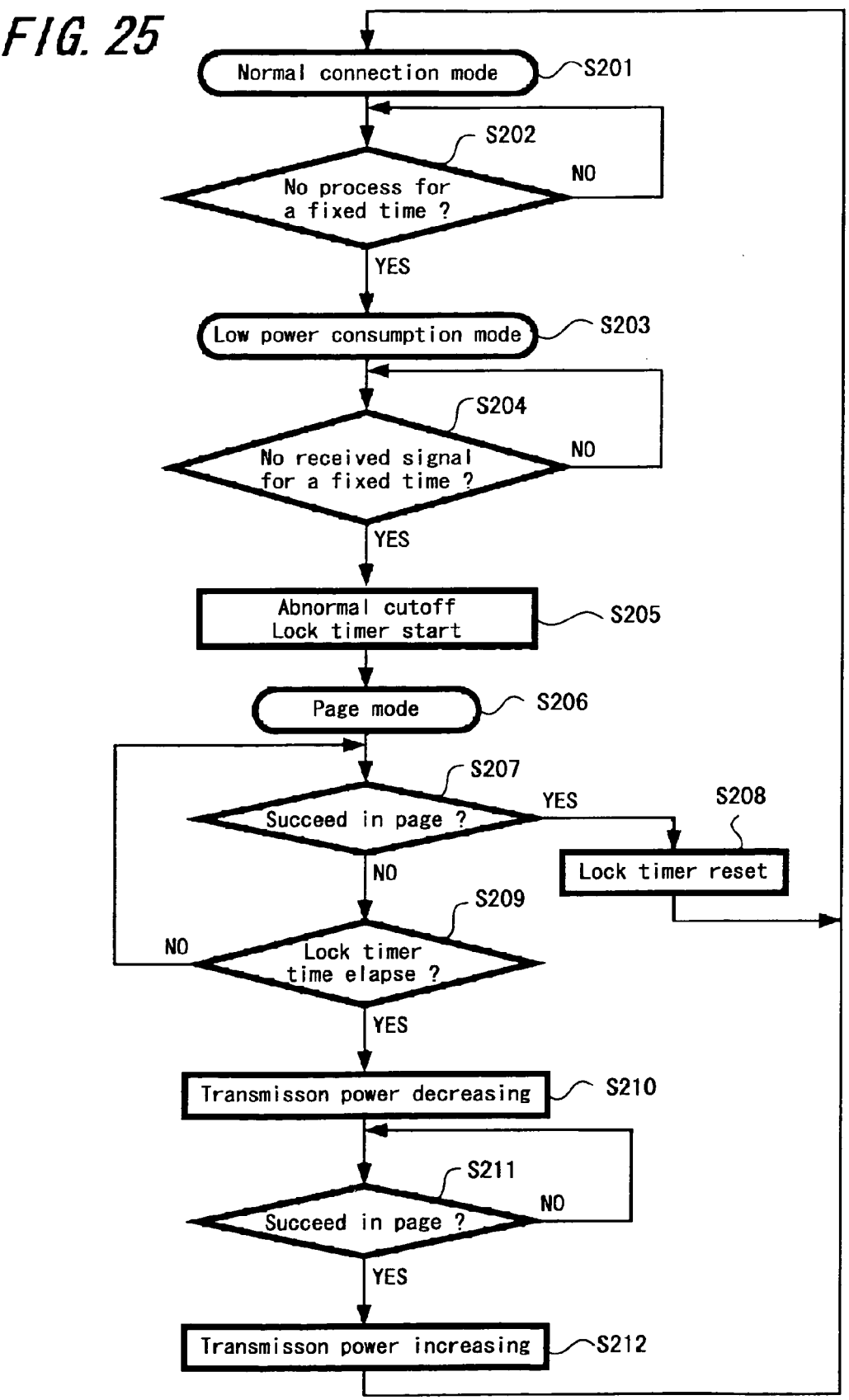

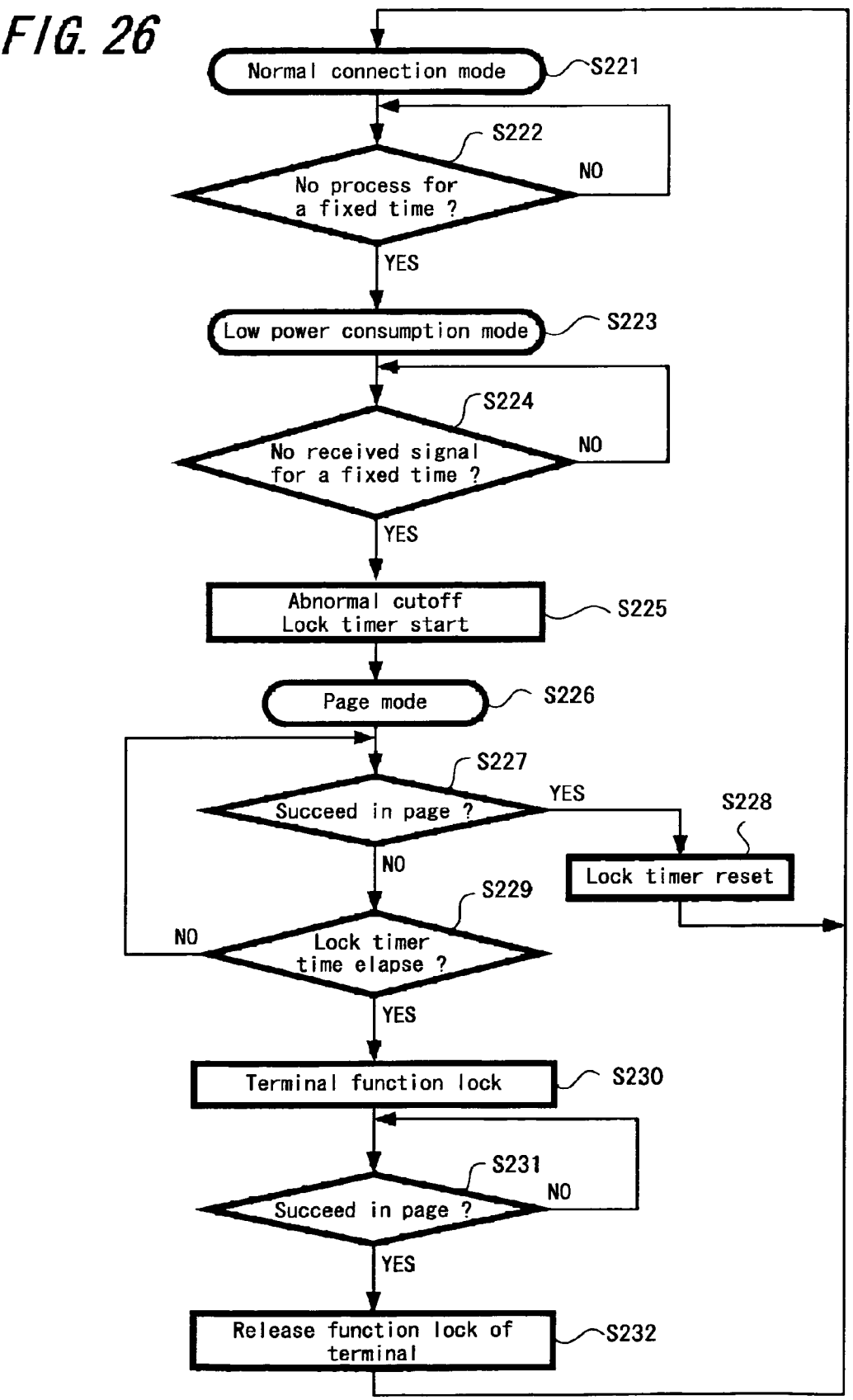

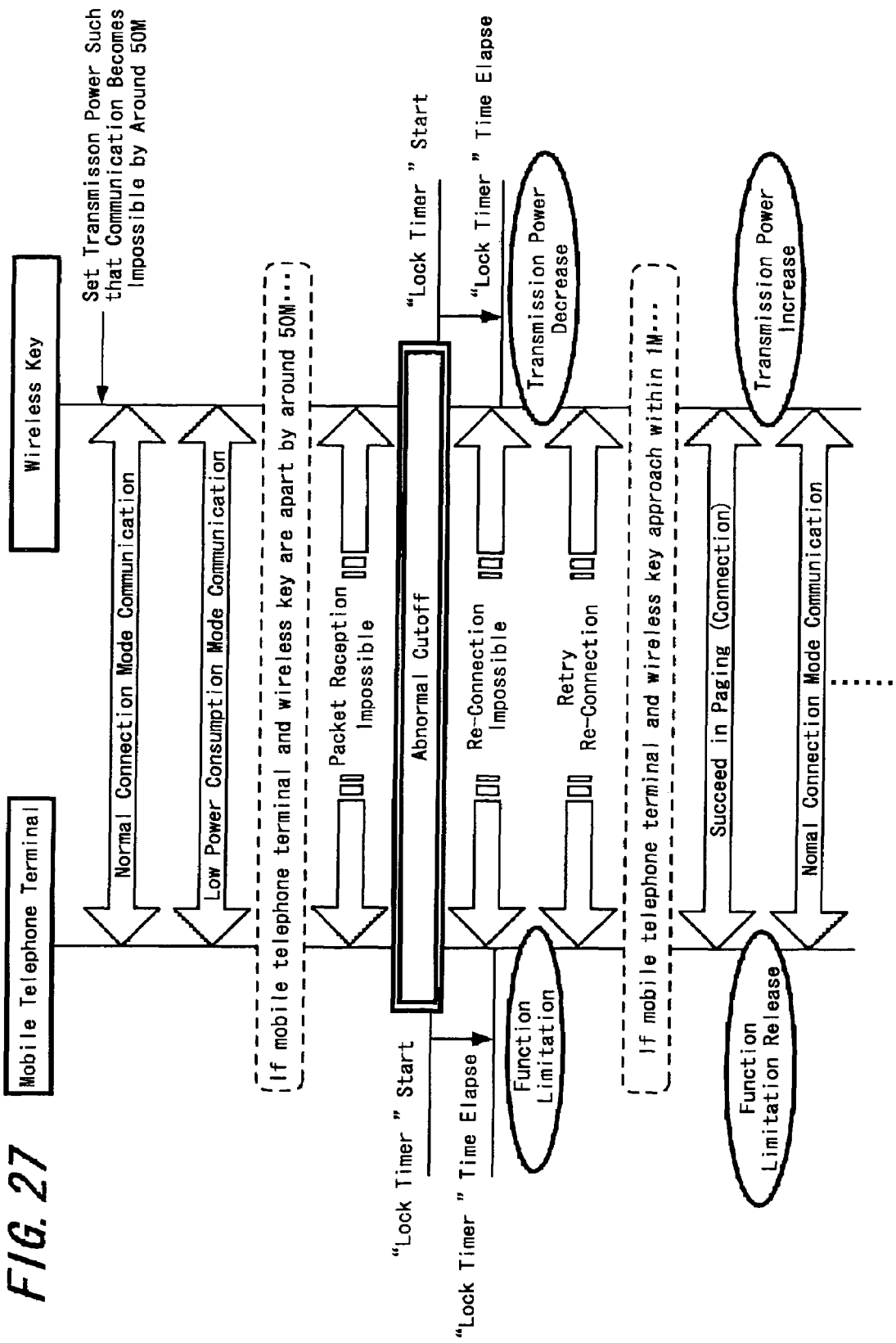

COMMUNICATION SYSTEM, COMMUNICATION TERMINAL APPARATUS AND WIRELESS KEY APPARATUS

CROSS REFERENCES TO RELATED APPLICATIONS

The present invention contains has recognized/(object) matter related to Japanese Patent Application JP 2004-195060 filed in the Japanese Patent Office on Jun. 30, 2004, the entire contents of which being incorporated herein by reference.

BACKGROUND OF THE INVENTION

1. Field of the Invention

The present invention relates, for example, to a communication system suitable for being applied to an apparatus constituted by a communication terminal apparatus such as a mobile telephone terminal and a wireless key apparatus restricting the operation of the terminal apparatus and to a communication terminal apparatus and a wireless key apparatus constituting the communication system.

2. Description of the Related Art

In recent years, a mobile telephone terminal which is one of communication terminal apparatuses a user always taking along in possession has a trend such that various functions other than wireless telephone functions of primary functions are built-in so as to contain multi functions.

For example, there exists such a terminal in which a camera function carrying out a filming of a still picture and a moving picture, a recording and reproducing function of music data, a viewing and listening function of television broadcast or the like is built-in.

In addition, in recent years, there has been rapidly developing a mobile telephone terminal in which a function as a non-contacting IC card is built-in. This non-contacting IC card is utilized as a boarding ticket of transport facilities, a membership card, an employee ID card, a card for price settlement means at a shop or the like. In this case, an authentication process is carried out by performing wireless communication between adjacent reader and writer, so that it is easy-to-use as compared with a magnetic card or the like. It should be noted in a case when an IC card function unit is mounted in a mobile terminal that the IC card function unit is not always necessarily to have a card type shape.

And now, it is preferable for the mobile telephone terminal having multi functions in this manner to be carried out with a process in order to secure some kind or another security for preventing various functions provided in the terminal from being abused when the terminal is lost. In particular, in case of a terminal installed with an IC card function unit, there is a possibility that personal information stored as the IC card function is read out unjustly or unjust settlement or the like utilizing the IC card function is carried out, so that the necessity for a function for preventing the unjust use thereof is high. There are descriptions, for example, in patent documents 1 and 2 that a wireless card which forms a pair with respect to the mobile telephone terminal is prepared and authentication request is wireless-transmitted periodically from that wireless card such that the functions of mobile telephone terminal is made to be restricted in a case when collation with respect to the authentication request cannot be taken.

More specifically, in a case when the mobile telephone terminal and the wireless card exchange ID (identification information) inherent therein periodically and a favorable communication state is maintained, that is, in a case when the ID exchange is realized, the mobile telephone terminal carries out a normal operation. On the contrary, when it is a state where the ID cannot be exchanged, that is, when the communication state is deteriorated or the communication is cut off, the use of partial function in the mobile telephone terminal is to be limited. In other words, it is possible to execute function limitation after presuming a distance between the mobile telephone terminal and the wireless card by utilizing wireless communication characteristics such that a favorable communication is possible when communication distance between the mobile telephone terminal and the wireless card is short and the communication state becomes deteriorated when the communication distance becomes long.

FIG. 1 shows one example of state transition in a terminal function limitation disclosed in related Japanese Patent Application No. 2004-195059 which was filed by the same applicant. FIG. 1 shows states of "page/page-scan mode", "normal connection mode" and "low power consumption mode".

In "page/page-scan", the wireless card side performs transmission process of a transmission signal and the mobile telephone terminal side performs detection of aforesaid transmission signal such that it is attempted whether or not the connection of the wireless card and the mobile telephone terminal can be realized. It is needless to say that it is also possible that the mobile telephone terminal side performs the transmission process and the wireless card side detects the transmitted signal.

In "normal connection mode", both apparatuses confirm authenticity of the connected partner and carry out a process for shifting to a low power consumption communication process if there is no problem. A sound telephone call period of a mobile telephone terminal or the like also lies in this state.

In "low power consumption mode", both apparatuses carry out packet transfer with the connection partner intermittently and confirm whether or not the wireless connection between the wireless card and the mobile telephone terminal is maintained.

Procedures on the occasion when limiting the use of the mobile telephone terminal function by utilizing aforementioned three states will be described.

(1) If packet cannot be received in "normal connection mode" and "low power consumption mode" state for a certain predetermined time period, it is deemed to be a connection abnormality or a connection failure (Abnormal LinkLoss) and the connection of the wireless card with the mobile telephone terminal is cut off.

(2) Further, when this connection abnormality is detected, a lock timer is activated. It is defined that a lock timer is a time period after the connection abnormality is cut off until the function limitation of the mobile telephone terminal is carried out.

(3) Then, after the abnormality is cut off, it is shifted to from "normal connection mode" or "low power consumption mode" to "page/page-scan mode (4)" and the mobile telephone terminal or the wireless card attempts a reconnection (paging).

(4) Here, in a case when the paging is succeeded within lock timer period, the lock timer is reset and it is shifted to "normal connection mode" and an operation is repeated from aforementioned 1).

(5) In a case if the paging is not succeeded within lock timer period, the mobile telephone terminal is function-limited (locked). When this function limitation is applied, it may be constituted such that a warning notice rings from the wireless card (warning mode) when the paging is not succeeded within a certain predetermined time period after the lock timer is activated and further the function limitation of the mobile telephone terminal is carried out after the time period elapses.

(6) Here, if a function limitation is applied to the mobile telephone terminal once, the function limitation of the mobile telephone terminal will not be released so long as a reconnection is succeeded by the paging (in this case, it is shifted to a normal connection mode from the paging).

According to abovementioned method, for example, if a user carries a wireless card attached his body and goes away from a mobile telephone terminal by putting only the mobile telephone terminal somewhere as it is, the communication state is deteriorated according to the free space loss or the like, the detection of a packet which a partner device transmits becomes difficult, finally a connection abnormality cut off occurs and a function limitation is executed on the mobile telephone terminal. In this manner, it is possible to execute a function limitation on the mobile telephone terminal when the wireless card is far from the mobile telephone terminal by a constant distance. Further, in a case when a connection can be carried out again after the function limitation is executed, it is possible to release the function limitation automatically. In this manner, it is possible to operate the security function of the mobile telephone terminal without consciousness of a user.

[Patent Document 1] Jap. laid-open patent publication No. 2001-352579

[Patent Document 2] Jap. laid-open patent publication No. 2001-358827

SUMMARY OF THE INVENTION

However, the transmission power on an occasion of a wireless communication according to an existing technology or the present case is always fixed, so that when, for example, the mobile telephone terminal and the wireless card are apart by a certain constant distance, abnormal cut off (Abnormal LinkLoss) can be detected and a function limitation is executed if they are apart by the constant distance, but the function limitation executed on the other hand is also to be released by approximately the same distance. According to this fact, the function limitation is to be released also from a place in which the mobile telephone terminal is apart from the wireless card and there is a possibility that it is abused by others.

Also, it is preferable for an apparatus such as a wireless card which is used as a pair with the mobile telephone terminal that there are few troubles as much as possible for everyday use thereof. However, practically relatively large power consumption occurs when data for authentication or the like are always exchanged with the mobile telephone terminal, so that it is necessary to charge or exchange the battery frequently and there was a problem of taking a lot of trouble.

SUMMARY OF THE INVENTION

In view of aforesaid matters, the present invention has recognized that the function limitation can be performed at a place of a communication terminal apparatus of a mobile telephone terminal or the like with a constant distance far from a wireless key apparatus which restricts the operation of the communication terminal apparatus, also the function limitation cannot be made to be released until the communication terminal apparatus comes to exists in the vicinity of the wireless key after the function limitation is once performed and at the same time, the power consumption is kept to be low.

According to one exemplified embodiment of the present invention, there is proposed a system which is constituted by a communication terminal apparatus and a wireless key apparatus which can carry out a wireless communication with the communication terminal apparatus by a predetermined wireless communication system. The communication terminal apparatus is provided with a communication unit for carrying out a wireless communication by the predetermined wireless communication system, a distance judgment unit for judging a distance from the wireless key apparatus and a control unit for limiting a predetermined function in response to the distance judged by the distance judgment unit. Also, the wireless key apparatus is provided with a communication unit for carrying out a wireless communication by the predetermined wireless communication system and a distance judgment unit for judging a distance from said communication terminal apparatus. In the communication system according to one exemplified embodiment of the present invention, at least one of the communication terminal apparatus and said wireless key apparatus is provided with a transmission power changing unit for controlling transmission power of a wireless signal which the communication unit of the one of apparatuses, wherein the control unit of the communication terminal apparatus limits the predetermined function when it is judged by the distance judgment unit that a first distance is exceeded during a connection with the wireless key apparatus and also the transmission power changing unit changes the transmission power such that the communication-possible distance between the the communication terminal apparatus and the wireless key apparatus becomes a second distance which is shorter than the first distance.

The communication system according to one exemplified embodiment of the present invention controls the transmission power in response to the state by utilizing a phenomenon that the communication-possible distance between the communication terminal apparatus and wireless key apparatus changes according to the magnitude of the transmission power outputted from the communication means. More specifically, with respect to the transmission power on the occasion when a connection confirmation process is performed between the communication terminal apparatus and the wireless key apparatus, the transmission power when the function limitation is released is made smaller than the transmission power when the function limitation is performed. Further, after the function limitation is released, the original transmission power when the function limitation is executed is again restored by being increased.

By constituting in this manner, the function limitation is executed at a place apart from the wireless key apparatus by a constant distance for the communication terminal apparatus and the function limitation is not executed in a near region (for example, a distance where a user can directly operate the telephone terminal apparatus). Further, after the function limitation is executed once, the function limitation is not released until the telephone terminal apparatus comes to exist in a near region and it is possible to release the function limitation automatically if it becomes a distance where a user can operate it directly.

According to one exemplified embodiment of the present invention, after the function limitation is executed once, the function limitation is not released until the communication terminal apparatus comes to exist in the vicinity of a user and the function limitation is released automatically when it becomes a distance where a user can operate it, so that reliability of the security for the communication terminal apparatus and usability of the function limitation function are improved.

Also, it is possible to decrease the power consumption as compared with a conventional case of a constant transmission power by lowering the transmission power of reconnection in a state in which a function limitation is executed for the communication terminal apparatus.

BRIEF DESCRIPTION OF THE DRAWINGS

FIG. 25 is a flowchart showing a function limitation process in a mobile telephone terminal apparatus according to one exemplified embodiment of the present invention;

FIG. 26 is a flowchart showing a transmission electric power control process in a wireless key according to one exemplified embodiment of the present invention; and FIG. 27 is a sequence diagram of a function limitation operation according to one exemplified embodiment of the present invention.

DESCRIPTION OF THE PREFERRED EMBODIMENTS

Hereinafter, one exemplified embodiment of the present invention will be explained with reference to FIGS. 2 to 27.

In the present invention, a wireless key apparatus carrying out a wireless communication with a mobile telephone terminal apparatus is prepared and it is constituted such that security lock of the mobile telephone terminal apparatus is to be carried out according to a wireless communication state of the both sides.

Figure 1:
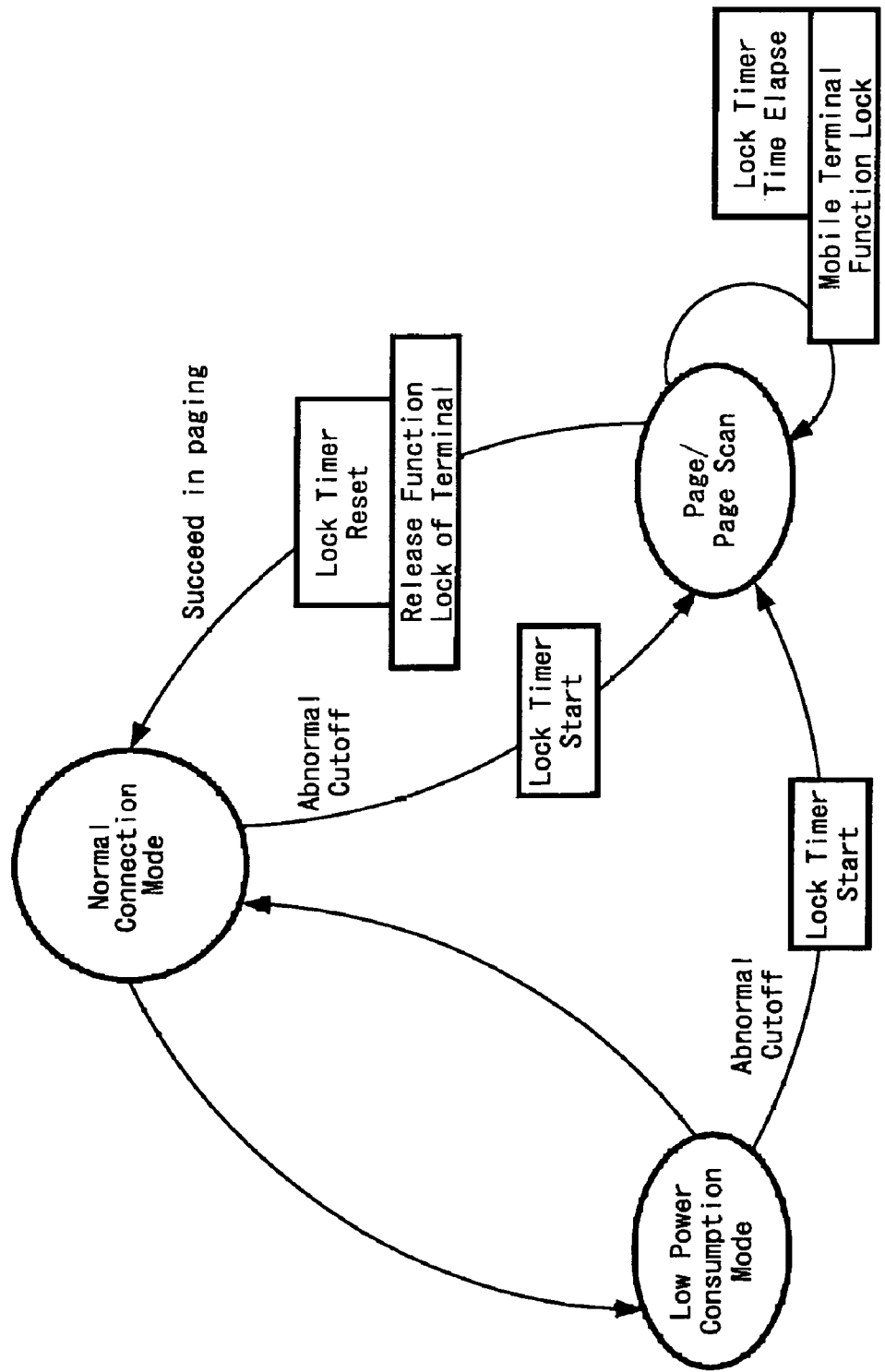
FIG. 1 is a diagram showing a state transition example disclosed in Jap. laid-open patent application No. 2005-19059.
Figure 2:
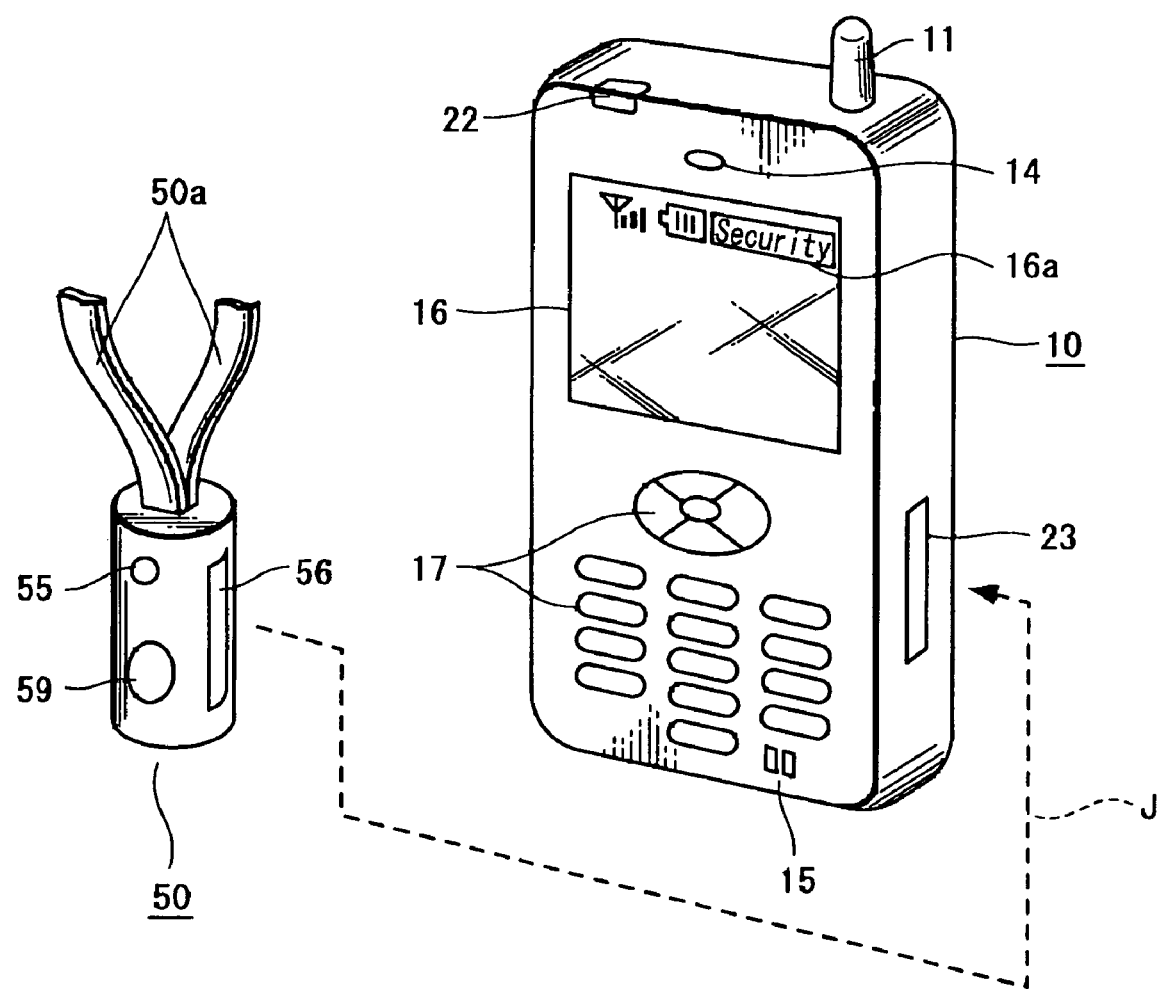
FIG. 2 is a perspective view showing a system constitutional example according to one exemplified embodiment of the present invention.

FIG. 2 is a diagram showing an example of an apparatus of the present invention. A wireless key apparatus 50 is prepared as a separate body with a mobile telephone terminal apparatus 10. According to this example, the wireless key apparatus 50 is constituted in a smaller size as compared with the mobile telephone terminal apparatus 10 and, for example, it is constituted such that it is hung around the neck of a user by a neck strap 50a or the like and is made to be a small sized shape which a user can always wear. The wireless key apparatus 50 is arranged with a light emitting unit 55 and an operation unit 59 (constituted in FIG. 2 such that they are push button shaped), and it is also constituted such that a terminal unit 56 for connecting with the mobile telephone terminal apparatus 10 is prepared.

As a mobile telephone terminal apparatus 10, there is shown here an example of a general mobile telephone terminal. In the mobile telephone terminal apparatus 10, there are arranged an antenna 11 for a wireless telephone communication, a speaker 14, a microphone 15, a display unit 16, an operation unit (operation key) 17, a light emitting unit 22 and the like. Also, a terminal unit 23 for connecting with the wireless key apparatus 50 is prepared. This terminal unit 23 may be used as an existing terminal which is prepared for the mobile telephone terminal apparatus 10 to be connected with a charger or various external apparatuses. Also, it may be constituted in the display unit 16 such, for example, that a security display 16 a showing that it is in an operation under a state that security is assured as explained hereinafter and a display (not shown) showing a fact that a so-called security lock in which the operation is limited according to its security function is executed may be carried out.

Figure 3:
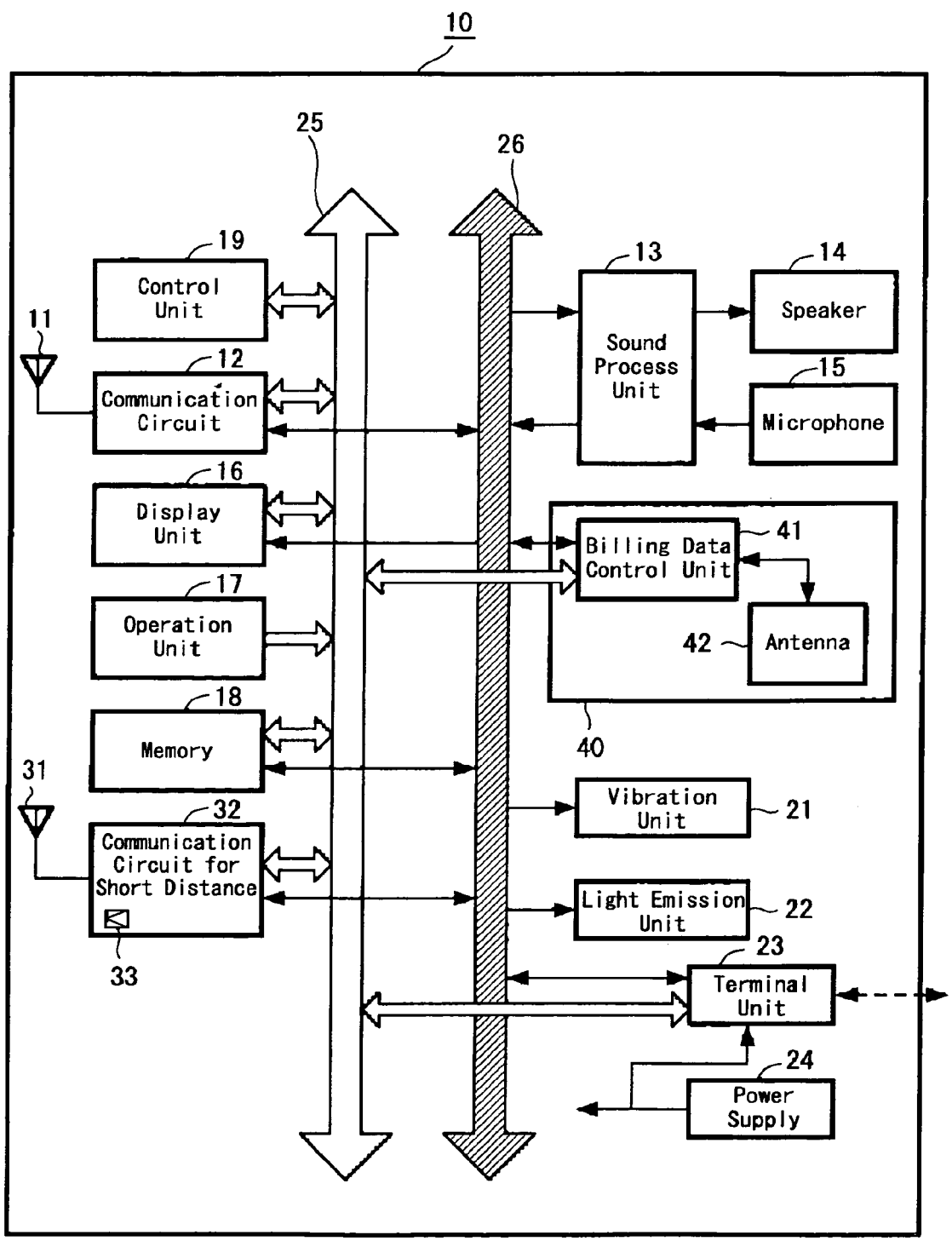
FIG. 3 is a block diagram showing a constitutional example of a communication terminal apparatus according to one exemplified embodiment of the present invention.

Next, a constitutional example of the mobile telephone terminal apparatus 10 of the present invention will be explained with reference to FIG. 3. The mobile telephone terminal apparatus 10 of the present invention is provided with an antenna 11 for a wireless telephone communication for carrying out a wireless communication with a base station for a wireless telephone and the antenna 11 is connected to a communication circuit 12 for a wireless telephone communication. Then, it is constituted such that a wireless communication is carried out with the base station under a control of a control unit 19. When a communication for a telephone call is carried out in the communication circuit 12, received sound data are supplied to a sound data processing unit 13 so as to perform a receiving process of the sound data. Then, they are supplied to a speaker 14 to be outputted. Also, sound data supplied from a microphone 15 are processed by the sound data processing unit 13. Then, they are supplied to the communication circuit 12 as sound data for transmission and are transmitted.

The mobile telephone terminal apparatus 10 is provided with a display unit 16 constituted by a liquid crystal display or the like and an operation unit 17 constituted by operation keys or the like. In the mobile telephone terminal apparatus 10, it is possible to display a mail sentence, a picture screen accessed to the web or the like on the display unit 16 an input operation of a telephone number, a mail sentence or the like and various mode settings or the like can be carried out by an operation unit 17.

These respective blocks in the terminal apparatus 10 are connected with the control unit 19 or the like by way of a control line 25. Also, each block is constituted such that data transfer can be carried out by way of a data line 26 so as to store necessary data in a memory 18. In the memory 18, not only data necessary as a mobile telephone terminal are stored but also it is possible to store data necessary in an IC card function unit 40 which will be described later on. Also, a necessary data saving for executing a program and/or for realizing the security function thereof is/can be carried out in the memory 18.

Also, the mobile terminal apparatus 10 is provided with a vibration unit 21 constituted by a vibration motor or the like which vibrates the terminal itself for carrying out notification of receiving signal by way of the telephone line to this terminal apparatus 10 and various warnings and a light emitting unit 22 constituted by a light emitting diode or the like. Then, the vibration and the light emission are carried out under a control of the control unit 19. These vibration unit 21 and light emitting unit 22 are used as notification means for notifying receiving signal or the like for the mobile telephone terminal and they are used also for necessary warning means as a security function. It should be noted that it is possible to output warning sound from the speaker 14 or the like in a case when sound is to ring as necessary warning means in the security function.

Then, the mobile telephone terminal 10 of the present invention is provided with a communication circuit 32 for short distance wireless communication in addition to the communication circuit 12 for telephone communication Then, it is carried out by using this communication circuit 32 a wireless communication with a partner within a relatively narrow region of, for example, around from several meters to hundred meters at the maximum by way of a connected antenna 31 (however, it is constituted such that a process for narrowing the communication possible region is to be executed when carrying out a communication during a normal period with the wireless key apparatus as will be described later on). Here, for example, a wireless communication system for short distance referred to as Bluetooth® is applied. In this short distance wireless communication, various kinds of use applications are supposed such, for example, that a communication is carried out with a head set for a hands-free telephone call or a communication with a personal computer apparatus is carried out through the mobile telephone terminal apparatus 10. As to the frequency band used for the wireless communication, for example, 2 GHz band is used, it is constituted such that a frequency band or modulation system which does not intervene in the wireless telephone communication in the communication circuit 12 is employed. According to this constitution, it is possible to carry out the wireless telephone communication in the communication circuit 12 and the communication in the communication circuit 32 for short distance wireless communication at the same time.

In case of this example, a wireless communication is carried out with a wireless key apparatus 50 by using this communication circuit 32 for short distance communication. However, a wireless communication is possible also with an apparatus (head set, personal computer apparatus or the like) other than the wireless key apparatus 50 if it is a communication apparatus of the same communication system. Also, in a case when a security function is executed, the wireless key apparatus 50 carrying out a wireless communication by the communication circuit 32 is to be limited to a specific one apparatus. For that purpose, for example, identification ID or the like of the apparatus is to be registered in the memory 18 or the like beforehand. With respect to registered information relating to this wireless key apparatus 50, it may be constituted such that a user cannot revise it.

A transmission amplifier 33 which amplifies the transmission signal in the communication circuit 32 is constituted such that transmission power is to be set in a plurality of steps by the control of the control unit 19 or the like. Also, in a state in which it is wireless-connected with the wireless key apparatus 50, it is constituted such that low transmission power among the plurality of steps is to be set. Further, in a state in which it is connected with an apparatus other than the wireless key apparatus 50, transmission power of a relatively high step is to be set. It should be noted in a case when it is wireless-connected with an apparatus installed a function for a wireless key apparatus such as a head set which will be described later on that the transmission power is to be set depending on the operation state of the partner apparatus at that time (more specifically, depending on whether or not it is operated only as a wireless key apparatus or whether or not combined another function is operated). It will be described later on with respect to a concrete process example for setting the transmission power.

The mobile telephone terminal 30 of the present invention is provided with a non-contacting IC card function unit 40. The non-contacting IC card function unit 40 includes a billing data control unit 41 connection with an antenna 42 and an adjacent wireless communication in a very adjacent distance of around several centimeters is carried out with reader and writer. In this adjacent wireless communication, it is possible to operate the billing data control unit 41 by means of the power obtained by receiving a radio wave from the reader and writer side, but according to this example, it is constituted such that the billing data control unit 41 is to be operated by the power supply supplied from a power supply circuit 24 in the mobile telephone terminal 10.

When the IC card function is executed, the billing data control unit 41 reads out data necessary for billing or authentication from the memory 18 (or a memory in the billing data control unit 41 (not shown)) and an exchange of the read out data is carried out with the reader and writer by an adjacent wireless communication. For example, in a case when it is functioned as a boarding ticket of transport facilities, it is constituted such that the billing data control unit 41 transmits data charged amount of money or the like which is possible to be paid by direct debit for an effective zone and an effective period as a boarding ticket (commutation ticket) or as a boarding ticket or personal information or the like relating to a person possessing this terminal (IC card) to the reader and writer so as to carry out a billing process or an authentication process. In case of using an employee ID card, a membership card, a card for price settlement, a credit card or the like, necessary information for its authentication is also exchanged.

Further, it is constituted such that the mobile telephone terminal apparatus 10 of the present invention is provided with a terminal unit 23 and various peripheral apparatuses, data process apparatuses which are not shown or the like can be connected directly thereto by way of this terminal 23. In this case, it is constituted such that power supply can be applied to external apparatuses connected by means of the terminal unit 23 from the power supply circuit 24 installed with a secondary battery or the like which applies power supply to respective portions in the mobile telephone terminal apparatus 10. For example, as shown by an arrow J of a dotted line in FIG. 2, it is constituted in a case when the terminal unit 56 of the wireless key apparatus 50 and the terminal unit 23 of this mobile telephone terminal apparatus 10 are connected directly such that it is possible to supply power to a secondary battery in the wireless key apparatus 50 from the power supply circuit 24 in the mobile telephone terminal apparatus 10 so as to charge it. Also, it is constituted in a case when the wireless key apparatus 50 is connected directly to the terminal unit 23 of the mobile telephone terminal apparatus 10 such that the control unit 19 of the mobile telephone terminal apparatus 10 detects that fact and a security process when directly connected (for example, security process executed without short distance wireless communication which will be described later on) is to be carried out.

Figure 4:
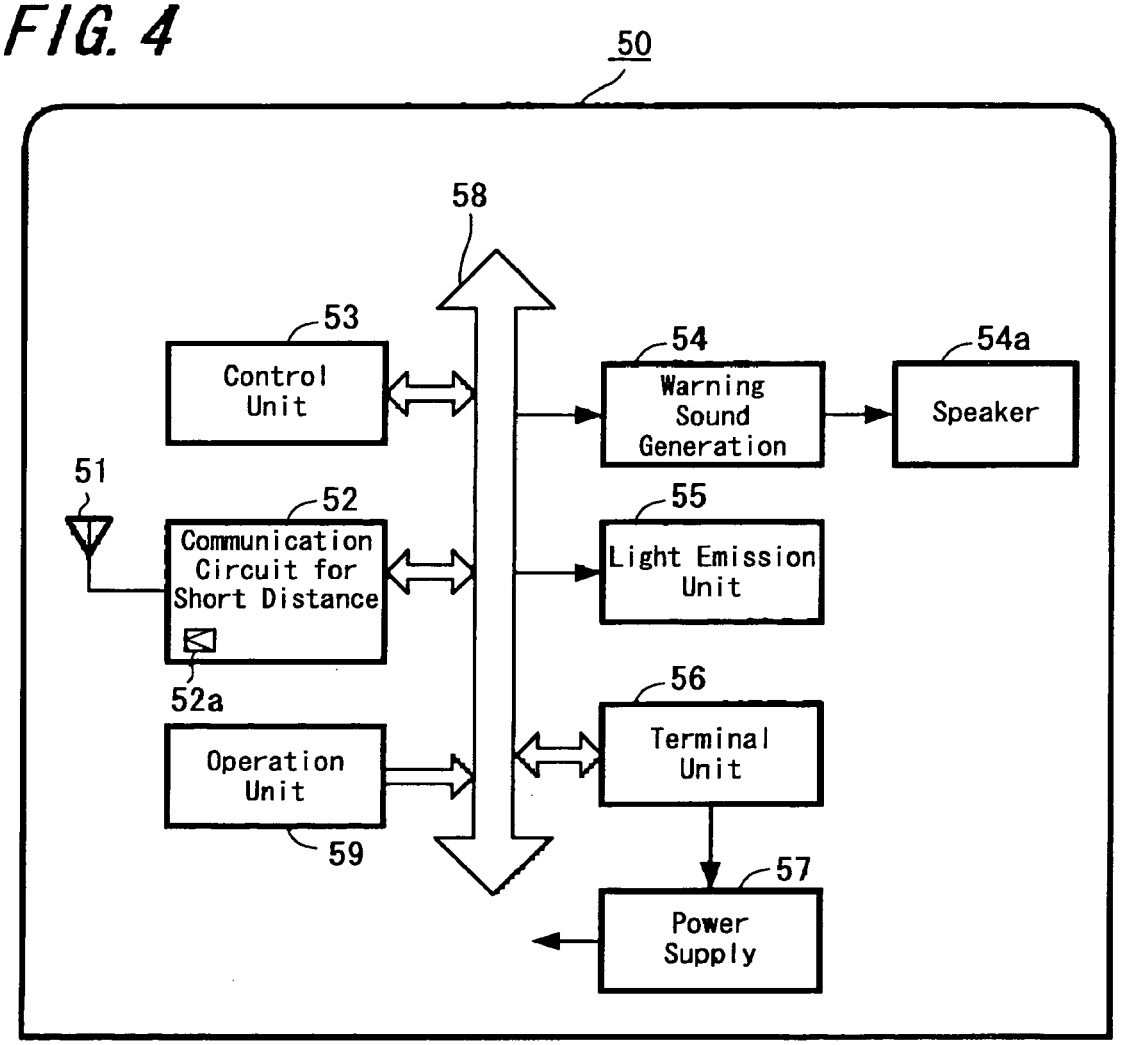
FIG. 4 is a block diagram showing a constitutional example of a wireless key apparatus according to one exemplified embodiment of the present invention.

Next, it will be explained with respect to the constitution of the wireless key apparatus 50 which carries out a wireless communication with the mobile telephone terminal apparatus 10 according to the present invention with reference to FIG. 4. The wireless key apparatus 50 of the present invention is provided with a communication circuit 52 for short distance wireless communication. Then, by using this communication circuit 52, a wireless communication is carried out with a partner in a relatively narrow region of, for example, around several meters and at the maximum hundred meters by way of a connected antenna 51 (however, it is constituted when communication is carried out normally with the mobile telephone terminal apparatus 10 such that a process for narrowing the communication possible region is executed). Here, it is constituted such that Bluetooth system which is a short distance wireless communication system provided on the mobile telephone terminal apparatus 10 side is also applied to the wireless key apparatus 50. The partner carrying out a wireless communication by the communication circuit 52 is limited to a specific one of the mobile telephone terminal apparatus 10. For that purpose, for example, the identification ID or the like of its apparatus was registered beforehand. With respect to the registered information as to the mobile telephone terminal apparatus 10, it may be constituted such that a user cannot revise it.

With respect to the wireless communication in the communication circuit 52, it is executed under a control of a control unit 53. In this case, it is constituted such that transmission power is to be set in a plurality of steps in a transmission amplifier 52*a* which amplifies a transmission signal in the communication circuit 52 under a control of the control unit 53 or the like. Also, in a state where it is wireless-connected with the mobile telephone terminal apparatus 10, a low transmission power is to be set in the plurality of steps. However, it is constituted in a case when the control unit 53 detects that an operation unit 59 (button shaped operation unit or the like as shown in FIG. 2) arranged in the wireless key apparatus 50 is operated such that a process for heightening the transmission power temporarily in the transmission amplifier 52*a* is to be carried out.

The wireless key apparatus 50 of this example is provided with a warning sound creation unit 54 connected with a speaker 54 *a* for outputting warning sound and a light emitting unit 55 constituted by a light emitting diode or the like. Then, output of the warning sound, vibration and light emission are carried out under the control of the control unit 53. These warning sound creation unit 54 and light emitting unit 55 are used as warning means necessary for security function. Also, it is constituted such that the light emitting unit 55 functions also as display means which displays the security mode at present in a state where a wireless communication is carried out with the mobile telephone terminal apparatus 10 and the security function is operated. Specifically, for example, the light emitting unit 55 functions also as display means for displaying a security mode by changing the display such that when the light emitting unit 55 is blinking in green, it indicates that it is in a normal mode and when it is blinking in red, it indicates that it is in a warning mode, when there is no display at all, it indicates that it is in a function limitation mode, or the like. The display means for displaying the security mode may be constituted such that a liquid crystal display or the like is used and a display where modes can be recognized directly by characters and figures or the like is carried out. Also, it may be constituted as warning means for warning by vibration.

It is constituted such that the control unit 53 and each unit is connected by means of a control line 58 and a wireless communication in the communication circuit 52, operations in the warning sound creation unit 54 and the light emitting unit 55 and the like are executed under a control of the control unit 53.

Also, it is constituted such that the wireless key apparatus 50 of the present invention is provided with a terminal unit 56 and the mobile telephone terminal apparatus 10 can be connected directly by using this terminal 56. When connected thereof, the control unit 53 in the wireless key apparatus 50 carries out a data transfer directly with the control unit 19 in the mobile telephone terminal apparatus 10 and carries out a security process when directly connected without carrying out a short distance wireless communication. Also, in a case when remaining charge amount of the secondary battery installed in a power supply circuit 57 in the wireless key apparatus 50 is small, it is possible to charge the secondary battery in the power supply circuit 57 by an power supplied from the side of the mobile telephone terminal apparatus 10.

Figure 5:
FIG. 5 is an explanatory diagram showing a usage example according to one exemplified embodiment of the present invention.

When the mobile telephone terminal apparatus 10 and the wireless key apparatus 50 constituted in this manner are used, a user always carries the wireless key apparatus 50 as shown, for example, in FIG. 5. Then, it is constituted such that when the user uses the mobile telephone terminal apparatus 10, the function is not to be limited (normal mode which will be described later on). Then, in a case when a user goes away from the mobile telephone terminal apparatus 10 by a distance of a certain degree after putting the mobile telephone terminal apparatus 10 somewhere in a state where the wireless key apparatus 50 is always maintained to be carried, a warning operation is executed from the wireless key apparatus 50 (warning mode which will be described later on). If he stays away from the mobile telephone terminal apparatus 10 in a state where the warning operation is executed, it becomes a state where the function of the mobile telephone terminal apparatus 10 is limited (function limitation mode which will be described later on). It should be noted with respect to the warning operation in a warning mode that it may be constituted such that it is to be carried out only on the side of the mobile telephone terminal apparatus 10. Alternatively, it may be constituted such that the warning operation in the warning mode is to be carried out in both of the wireless key apparatus 50 and the mobile telephone terminal apparatus 10.

With respect to a function of the mobile telephone terminal apparatus 10 which is limited in a function limitation mode, it is a choice, for example, to direct to all of the functions of the mobile telephone terminal apparatus 10 (however, communication function related to security function is not to be limited) and it is another choice to direct to a partial function within the function which the terminal apparatus 10 is provided with. Specifically, it may be constituted, for example, such that only the process using the non-contacting IC card function unit 40 is to be limited. Also, it may be constituted such that address book inspection of the mobile telephone terminal apparatus 10, display of personal information of mail inspection or the like is to be limited. Also, it may be constituted such that only the reception of a signal can be allowed while the transmission as a wireless telephone is to be limited. Also, it may be constituted such that only the reception of a signal can be allowed while the transmission as a wireless telephone is to be limited. In this case, it may be constituted such that only the telephone number for emergency announcement to a police station or the like can be transmitted. Also, it may be constituted such that a process using the non-contacting IC card function unit 40 is not to be limited while only the function as a wireless telephone apparatus is to be limited.

The wireless key apparatus 50 explained so far was constituted as an apparatus for exclusive use which carries out only the security function, but it should be noted that it may be constituted such that it is to be mounted on an apparatus having other function. For example, it may be constituted such that a wireless key apparatus is to be mounted on a head set for carrying out a wireless communication of Bluetooth system with the mobile telephone terminal apparatus 10 and carrying out a so-called hands-free telephone call.

Figure 6:
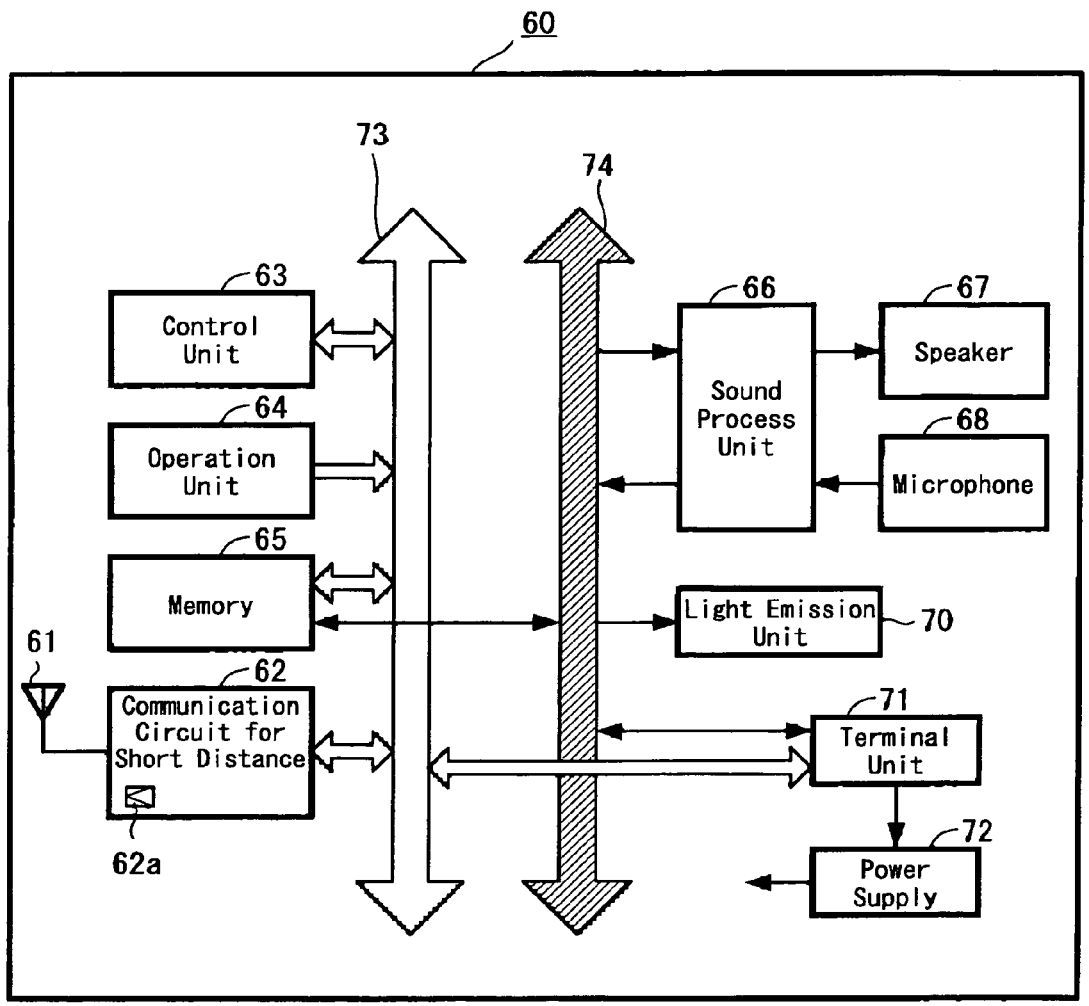
FIG. 6 is a block diagram showing a modified example of a wireless key apparatus (example integrated with head set) according to one exemplified embodiment of the present invention.

FIG. 6 is a diagram showing a constitutional example of a head set with this wireless key. A head set with a wireless key 60 according to the present invention is provided with a communication circuit 62 for short distance wireless communication. This communication circuit 62 carries out a wireless communication with a partner in a relatively narrow region of, for example, around several meters and at the maximum hundred meters by way of a connection antenna 61. Here, Bluetooth system which is the same system as the short distance wireless communication system provided on the side of the mobile telephone terminal apparatus 10 is applied also to the communication circuit 62 of the head set with the wireless key. The partner carrying out a wireless communication by the communication circuit 62 is limited to the specific one of the mobile telephone terminal apparatus 10 which was registered. For that purpose, for example, identification ID of the apparatus or the like is registered beforehand. However, it may be constituted when using only the head set such that there is no limitation for the partner whom the communication circuit 62 carries out a wireless communication.

With respect to the wireless communication in the communication circuit 62, it is executed under a control of the control unit 63. In this case, it is constituted such that transmission power for the transmission amplifier 62a which amplifies the transmission signal in the communication circuit 62 is to be set under a control of the control unit 63 or the like.

When a communication for the head set (more specifically, sound data communication for a telephone call) is carried out in the communication circuit 62, received sound data are supplied to a sound data processing unit 66 and a receiving process of the sound data is performed. Thereafter, they are supplied to a speaker 67 and outputted. Also, sound data picked up by a microphone 68 are processed in the sound data processing unit 66 so as to become sound data for transmission. Then, the sound data for transmission are supplied to the communication circuit 62 and transmitted.

In addition, the head set with the wireless key 60 of the present invention is provided with an operation unit 64 constituted by operation keys or the like, a memory 65 and a light emitting unit 70. The light emitting unit 70 is used as warning means relating to the security function and at the same time used also as display means of operation state on the occasion when it is functioned as a head set. These respective units in the head set 60 can carry out exchange of control data by way of a control line 73. Further, the respective units can carry out exchange of sound data or the like by way of a data line 74.

Also, the head set with the wireless key 60 of the present invention is provided with a terminal unit 71 and it is constituted such that the mobile telephone terminal apparatus 10 can be connected directly by means of this terminal 71. When connected with the mobile telephone terminal apparatus 10 directly, it is constituted such that the control unit 63 in the head set with the wireless key 60 carries out a data transfer directly with the control unit 19 in the mobile telephone terminal apparatus 10 and a direct sound data transfer or a security process is to be carried out without a short distance wireless communication. Also, in a case when remaining charge amount of a secondary battery installed in a power supply circuit 72 in the head set with the wireless key 60 is small, it is possible to charge the secondary battery in the power supply circuit 72 by an power supplied from the side of the mobile telephone terminal apparatus 10.

Figure 7:
FIG. 7 is an explanatory diagram showing a usage example of the example in FIG. 6.

In a case when such a head set with a wireless key 60 is prepared, as shown, for example, in FIG. 7, a user putting on the head set with the wireless key 60 can carry out a so-called hands-free telephone call depending on a fact that the mobile telephone terminal apparatus 10 which remains inside a bag or the like and the head set with the wireless key 60 carries out a wireless communication. Further, with respect to a function as a wireless key apparatus, a warning and a function limitation of the mobile telephone terminal apparatus 10 are executed according to position relationship (distance) between the head set with the wireless key 60 and the mobile telephone terminal apparatus 10. More specifically, in a case when the mobile telephone terminal apparatus 10 goes away from the head set with the wireless key 60 to a certain degree of distance, the head set with the wireless key 60 or the mobile telephone terminal apparatus 10 (alternatively, both sides) carries out a warning operation (warning mode which will be described later on). Then, if the user stays away from the mobile telephone terminal apparatus 10 in the state in which this warning operation was carried out, it becomes a state in which the function of the mobile telephone terminal apparatus 10 is limited (function limitation mode will be described later on).

Next, it will be explained with respect to a process example in a case when a security process is carried out by preparing the mobile telephone terminal apparatus 10 and the wireless key apparatus 50 of such a constitute. It should be noted that also a security process in case of using the head set with the wireless key 60 is basically similar, but it will be explained in the explanation hereinafter on the assumption that the wireless key apparatus 50 is used.

First, it will be explained with reference to FIG. 8 with respect to a security process mode (hereinafter designates as security process mode). It is constituted in case of this example such that there are prepared a normal mode M1 which does not limit the function of the mobile telephone terminal apparatus 10, a warning mode M2 for warning that it gets out of the normal mode caused by a fact that the distance between the mobile telephone terminal apparatus 10 and the wireless key apparatus 50 goes away or the like and a function limitation mode M3 for limiting the function of the mobile telephone terminal apparatus 10 in a case when it does not return to from the warning mode to the normal mode (more specifically, in a case when the distance between the mobile telephone terminal apparatus 10 and the wireless key apparatus 50 remains in a far state).

Figure 8:
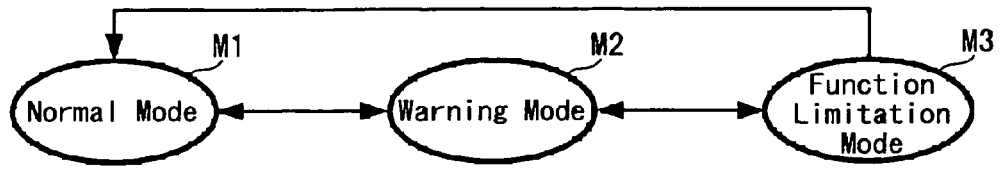
FIG. 8 is an explanatory diagram showing a setting example of a security mode according to one exemplified embodiment of the present invention.

With respect to the transition of these modes, there are, as shown by arrows in FIG. 8, a change from the normal mode M1 to the warning mode M2 and a change from the warning mode M2 to the function limitation mode M3 and further, it returns to the normal mode M1 if the wireless key apparatus 50 approaches the mobile telephone terminal apparatus 10 in a state in which it became the function limitation mode M3. Further, it returns to the normal mode M1 if the wireless key apparatus 50 approaches the mobile telephone terminal apparatus 10 in a state in which it became the warning mode M2 and the warning operation is carried out.

Figure 9:
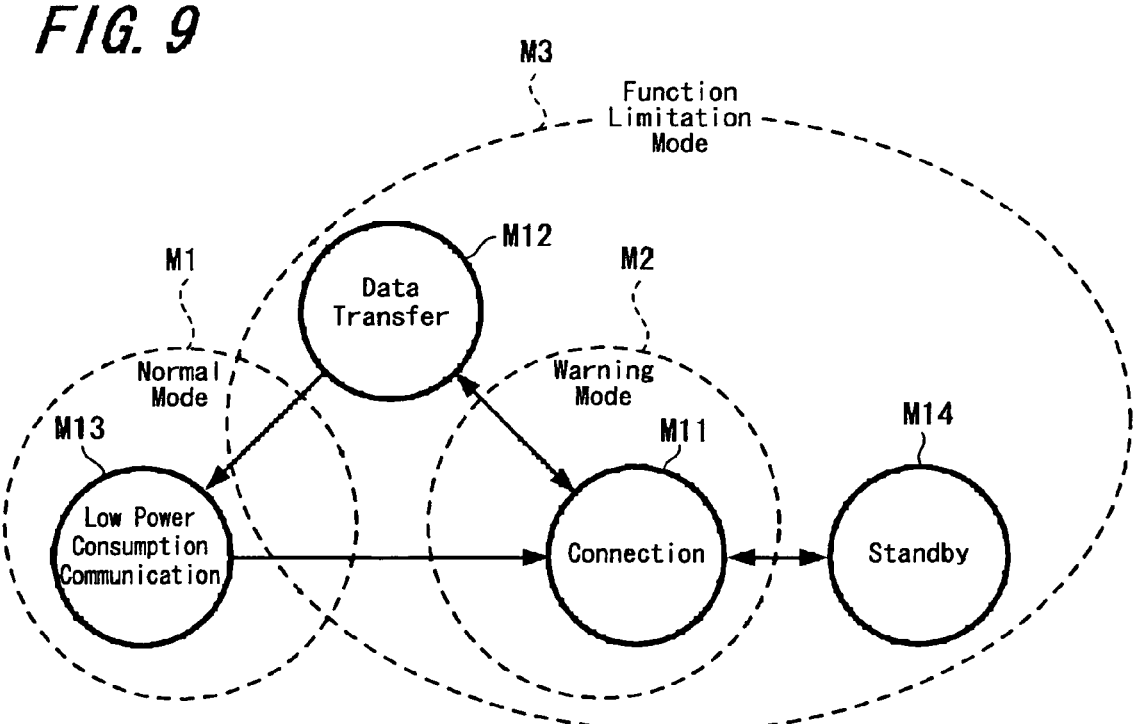
FIG. 9 is an explanatory diagram showing a transition example of a security mode by a communication mode according to one exemplified embodiment of the present invention.

In case of the present invention, these security modes are made to have relation with the communication modes prepared in the Bluetooth system which is a wireless communication system between the mobile telephone terminal apparatus 10 and the wireless key apparatus 50. More specifically, as communication modes in the wireless communication system (Bluetooth system) of this example are shown in FIG. 9, there is a connection mode M11 for authenticating and wireless-connecting the partner apparatus in both of the mobile telephone terminal apparatus 10 and the wireless key apparatus 50. When authentication is completed mutually and connection is carried out in the connection mode M11, it becomes a data transfer mode M12 in which payload data transfer is carried out practically. When the data transfer is completed in the data transfer mode M12, it is shifted to a low power consumption communication mode M13. In this low power consumption communication mode M13, the wireless communications of both sides are carried out intermittently by a cycle longer than a communication cycle in the data transfer mode M12 and it becomes a state in which the wireless connection between the both sides is maintained. Owing to the fact that the cycle carrying out the intermittent communication is long in this manner, it becomes possible to make the power consumption required for the communication smaller than a case in which it is operated in the data transfer mode M12 and low power consumption is realized. It should be noted that the low power consumption here indicates a phenomenon that the low power consumption is realized by thinning out communication cycles and is not related directly to the process for lowering the transmission power which will be described later on (however, it is constituted as described later on such that a process for lowering transmission power is carried out during a low power consumption mode).

In a case when the data transfer between the both sides is to be restarted in a state of this low power consumption communication mode M13, it returns to the connection mode M11, a process for restarting the communication is carried out in the connection mode M11 and thereafter it becomes the data transfer mode M12 in which the data transfer is carried out practically. In a state in which the wireless connection is maintained in the low power consumption communication mode M13, the connection process in the connection mode M11 is carried out relatively simply and it is possible to carry out the restart of the data transfer rapidly as compared with a case in which the wireless connection is recommenced.

Also, in a case when a connection process with anyone of communication partners is not carried out in the connection mode M11 (or in a case when a connection is not possible), each apparatus is shifted to the standby mode M14. The apparatus which becomes this standby mode M14 carries out an intermittent reception or transmission with a very long cycle and carries out a process for searching whether or not a communication apparatus to become a partner exists. Here, it may be constituted such that the apparatus becoming the standby mode M14 does not return to the connection mode M11 if there is no process which may become some kind or another opportunity caused by a user operation or the like. Also, during a period when a communication is carried out between two apparatuses, the two apparatuses are to be set in the same mode basically. More specifically, at least the connection mode M11, the data transfer mode M12 and the low power consumption mode M13 are the modes which shift in synchronism with each other between the two apparatuses.

Here, in case of the present invention, as shown in FIG. 9, the normal mode M1 is set as a security mode when it is a state in which it communicated between the mobile telephone terminal apparatus 10 and the wireless key apparatus 50 in the low power consumption communication mode M13 and a warning mode is started by an opportunity that the communication mode shifts from the low power consumption communication mode M13 to the connection mode M11. The process with respect to the detail in which it is shifted from a warning mode to a function limitation mode will be described later on, but when the security mode becomes the function limitation mode M3, the function limitation mode M3 remains during a period when it is the connection mode M11, the data transfer mode M12 and the standby mode M14. It is constituted only in a case when it is shifted from the data transfer mode M12 to the low power consumption communication mode M13 such that the security mode is to return from the function limitation mode M3 to the normal mode M1.

Figure 10:
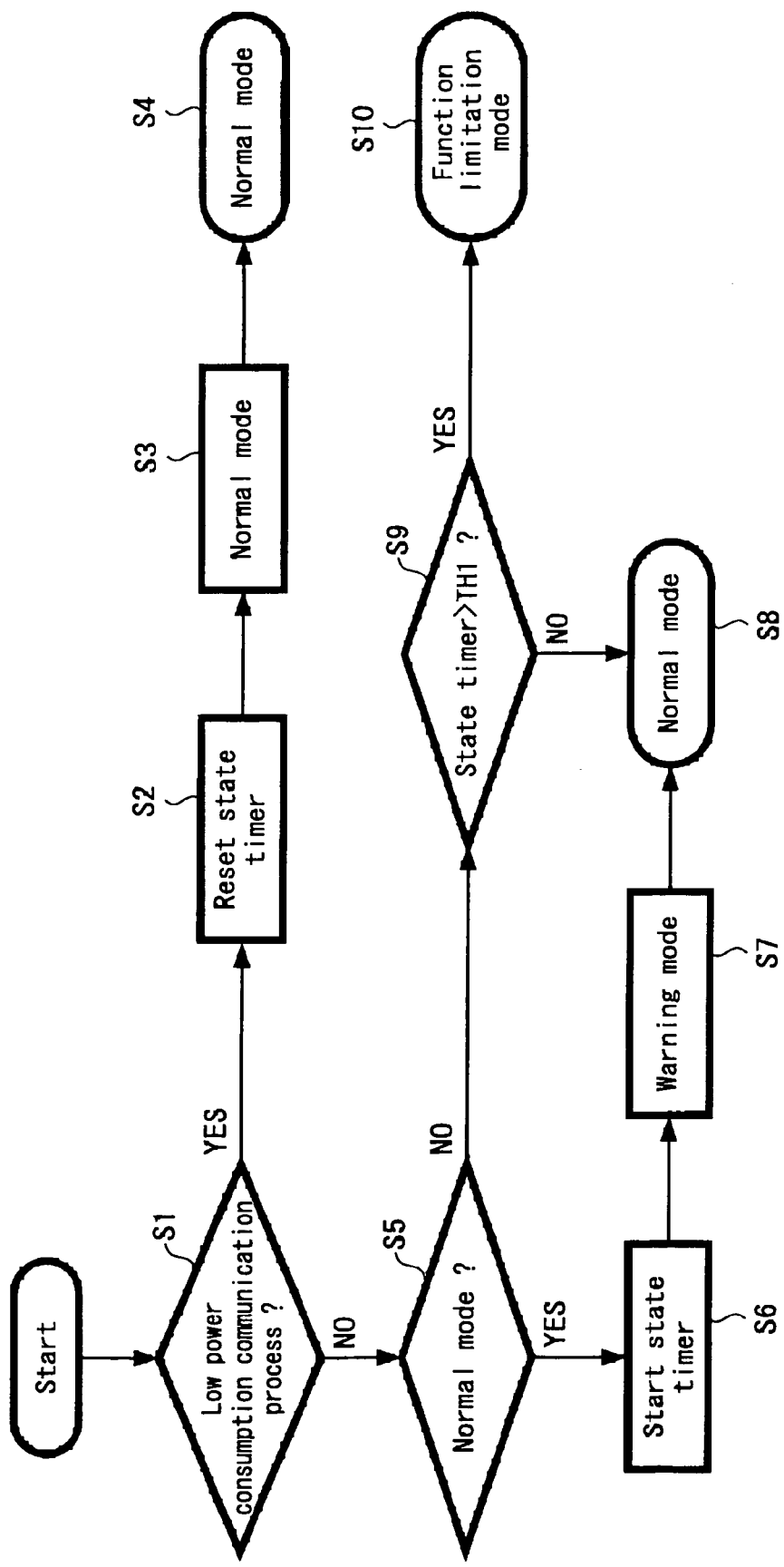
FIG. 10 is a flowchart showing a mode selection process example according to one exemplified embodiment of the present invention.

Next, it will be explained a process in which the security mode is selected in each of the mobile telephone terminal apparatus 10 and the wireless key apparatus 50 with reference to FIG. 10. This security mode selection process is, for example, executed under the control of the control units 19 and 53 of the respective apparatuses.

First, it is judged whether or not the communication mode at present is in a low power consumption communication mode (step S1). Here, in a case when it is in a low power consumption communication mode, a state timer prepared in the control unit is reset (step S2). Then, the security mode is set to a normal mode (step S3) and a process as a normal mode (more specifically, a mode without limiting the function) is executed (step S4). It should be noted that the state timer is a timer counted up by passage of time.

Also, in a case when it is judged in step S1 that it is not in a low power consumption communication mode, it is judged whether or not the security mode just before (at present) is a normal mode (step S5). Here, in case of a normal mode, a state timer prepared in the control unit is made to start (step S6). Then, a start of a warning mode is set (step S7) and a warning operation as a warning mode is executed (step S8). It should be noted that in a case when it is constituted such that only one of the mobile telephone terminal apparatus 10 and the wireless key apparatus 50 carries out the warning operation, any process is not carried out particularly in the other apparatus during the warning mode.

Then, in a case when it is judged in step S5 that the security mode just before (at present) is not a normal mode, it is judged whether or not the counted value of the state timer activated in step S6 exceeds a value TH determined beforehand (step S9). It remains in the warning mode of step S8 until the counted value exceeds the predetermined value TH1 and in a case when the counted value exceeds the predetermined value TH1, it is made to change the security mode to a warning mode (step S10) It is designed such that the time period when the counted value of the state timer exceeds the predetermined value TH1 after the count is started is a time period, for example, of around several seconds to several ten seconds.

Next, it will be explained with reference to the drawings of FIG. 11 and subsequent thereto about a specific example of a communication state in each communication mode in each of the mobile telephone terminal apparatus 10 and the wireless key apparatus 50. First, it will be explained an example in which the mobile telephone terminal apparatus 10 and the wireless key apparatus 50 carry out the authentication process of a partner in the connection mode M11. In case of carrying out a wireless communication by Bluetooth system, one of the communication apparatus of the two apparatuses carrying out the communication becomes a master apparatus and the other communication apparatus becomes a slave apparatus. For the Bluetooth system, either one of the apparatuses may become a master or a slave, but in case of the present invention, it is to be set such that the wireless key apparatus 50 becomes a master and the mobile telephone terminal apparatus 10 becomes a slave.

The apparatus which became a slave (mobile telephone terminal apparatus 10 here) carries out a scan process for searching the master in a connection mode. FIG. 11 is a flowchart showing an operation example in this scan process. In the scan process, continuous reception is carried out for a constant period and a process for searching a signal from the master is carried out (step S11). It is judged in its scan process whether or not a signal (page signal) added with an ID number of the wireless key apparatus 50 which is a partner carrying out the security process was received (step S12). Here, in a case when signal added with the ID number of the wireless key apparatus 50 is not received, it is shifted to an idle process so as to wait for a constant period (step S13) and thereafter it returned to step S11 such that the scan process is repeated.

Then, in a case when it is judged in step S12 that the page signal added with the ID number of the wireless key apparatus 50 was received, a response signal with respect to that page signal is transmitted (step S14) and it is shifted to a communication state by carrying out a connection process with the master (more specifically, shifted to a data transfer mode M12) (step S16).

Next, FIG. 12 will be explained. The apparatus which became a master (here, wireless key apparatus 50) starts a standby timer when the connection mode starts (step S21). A page signal is transmitted by a determined channel for a predetermined period (step S22). At that time, for example, an ID number which was set for the own apparatus is added to the page signal and at the same time, the ID number of the communication partner is also added. Then, it is judged whether or not there is a response from the slave after the transmission of the page signal (step S23). In case of no response, it is judged whether or not the counted value of the standby timer exceeds a determined time period TH2 (step S24). In a case when the counted value of the standby timer does not exceed the determined time period TH2, it is shifted to an idle process and it waits for a constant period (step S25) and thereafter, it returns to step S22 and the transmission process of the page signal is repeated.

Then, in a case when it is judged in step S23 that there is a response from the slave, a connection process with the slave is performed and it is shifted to a communication state (more specifically, shifted to a data transfer mode) (step S27). Also, in a case when the counted value of the standby timer exceeds the determined time period TH2 in step S24, it becomes a standby state (step S28) and a process for attempting a connection with the slave here is discontinued.

Figure 11:
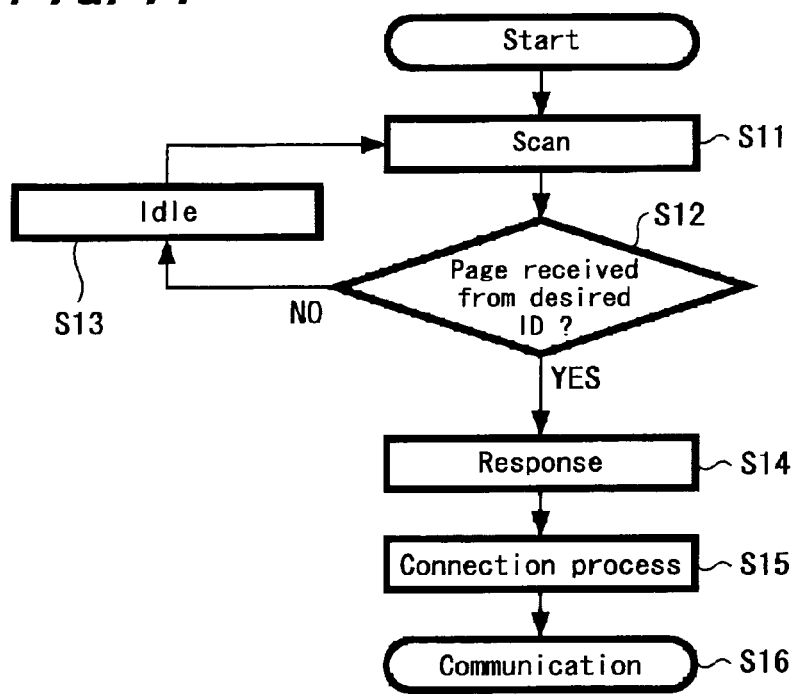
FIG. 11 is a flowchart showing a scanning process example according to one exemplified embodiment of the present invention.
Figure 12:
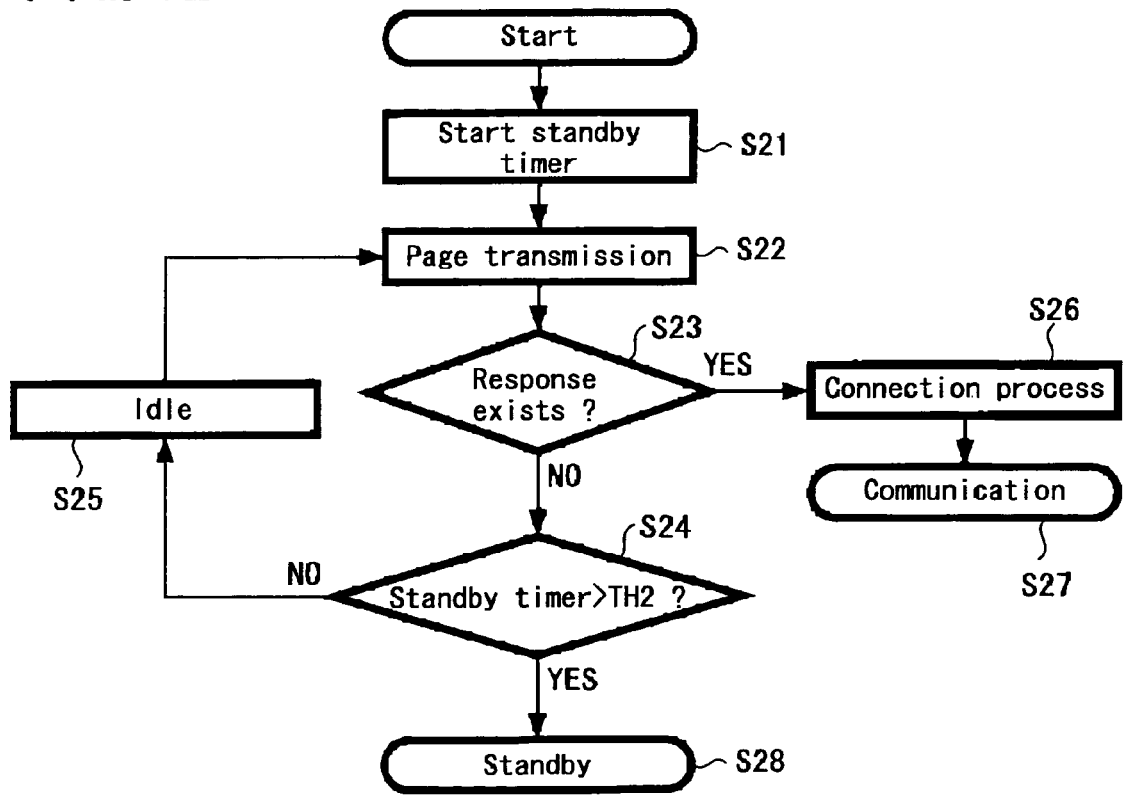
FIG. 12 is a flowchart showing a page transmission process example according to one exemplified embodiment of the present invention.

FIGS. 13A and 13B are diagrams showing an example of a communication state between the apparatus which became the master (wireless key apparatus 50) in which the process of the flowchart in FIG. 12 is carried out and the apparatus which became the master slave (mobile telephone terminal apparatus 10) in which the process of the flowchart in FIG. 11 is carried out. FIG. 13A shows a transmission timing of the page signal and an idle period of the master (wireless key apparatus 50). FIG. 13B shows a receiving (scan) timing and an idle period of the slave (mobile telephone terminal apparatus 10). As shown in FIGS. 13A and 13B, the idle period of the transmission side and the idle period of the receiving side are different from each other and it is constituted such that the page signal transmitted at any timings can be received on the receiving side.

Figure 13:
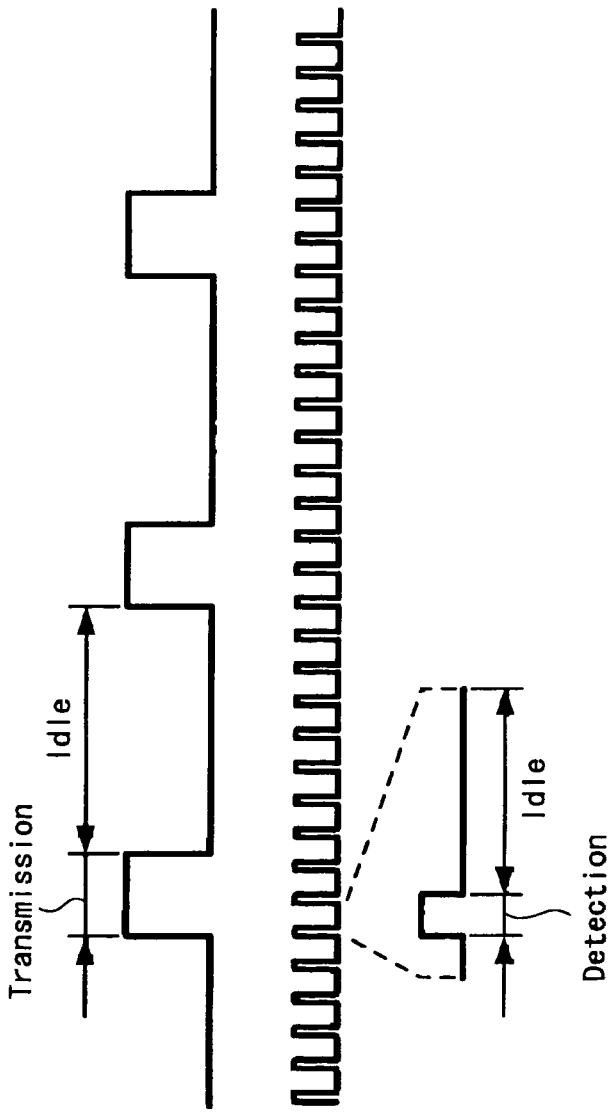
FIG. 13 is a timing diagram showing an example of a process state of a page transmission and a scanning according to one exemplified embodiment of the present invention.
Figure 14:
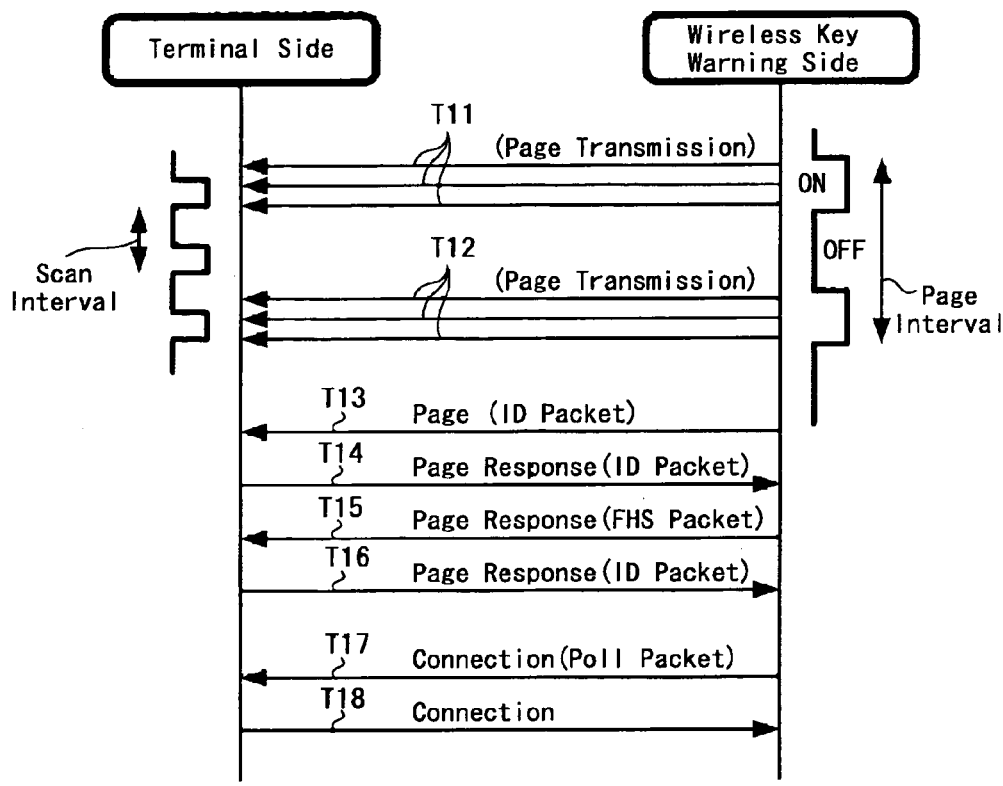
FIG. 14 is a sequence diagram showing an example of a connection state according to one exemplified embodiment of the present invention.

FIG. 14 is a diagram showing the process of FIG. 13 by a sequence diagram. As shown in FIG. 14, the transmission of the page signal is carried out from the wireless key apparatus 50 intermittently (at timing T11, T12, T13). Here, if there is a response with respect to the page signal (at timing T14), mutual exchange of the response between the two apparatuses are further carried out (at timing T15, T16), thereafter mutual exchange of the connection signal performing the wireless connection is carried out (at timing T17, T18) and it is shifted to a data transfer mode.

Next, a process example in a case when the respective apparatuses of the present invention are shifted to the data transfer mode M12 will be explained with reference to a flowchart of FIG. 15. When it is shifted to a data transfer mode, an authentication process in a channel in which the data transfer is carried out is performed (step S31). Then, it is judged whether or not the authentication was completed correctly (step S32). In a case when the authentication process is not completed here, it returns to the connection mode M11.

Then, in a case when the connection process in step S32 is completed, a data transfer is carried out ordinarily, but in the security process of the present invention, the data transfer is not carried out and a process for shifting to a low power consumption mode M13 is carried out directly (step S33). Then, it is judged whether or not it can be shifted to a low power consumption mode (step S34). In case of a state in which it can be shifted to a low power consumption mode M13, it is set to a sniff state of a low power consumption mode M13. In a case when it cannot be shifted to a low power consumption mode, it returns to the connection mode M11.

Figure 15:
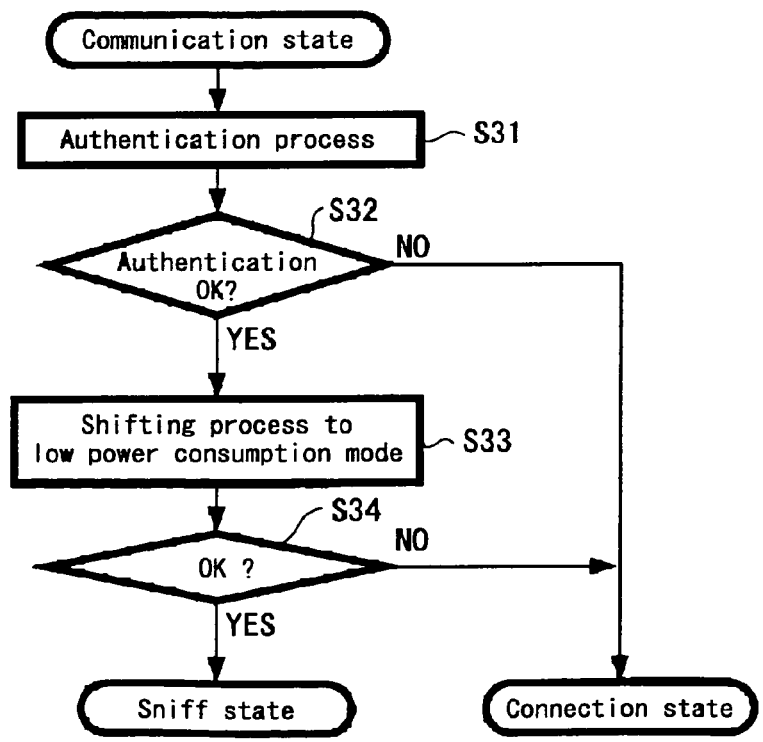
FIG. 15 is a flowchart showing a shifting process example for low power consumption according to one exemplified embodiment of the present invention.
Figure 16:
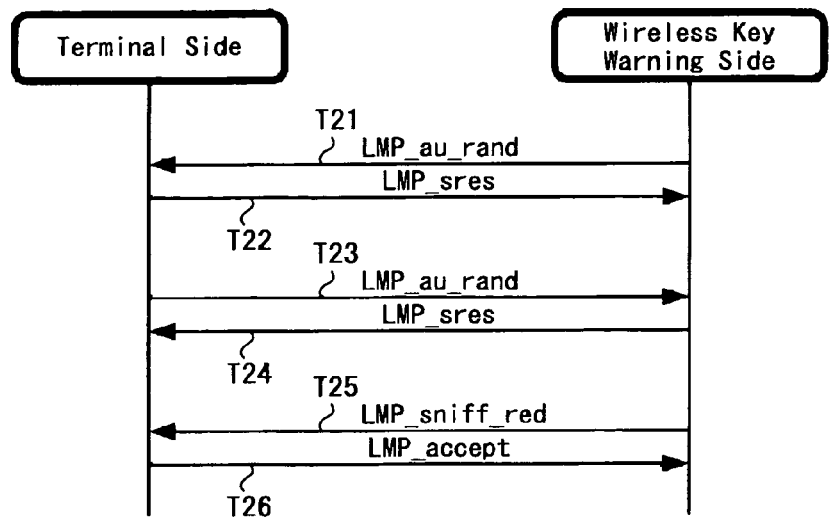
FIG. 16 is a sequence diagram showing a transmission example of a communication state message according to one exemplified embodiment of the present invention.

FIG. 16 is a sequence diagram showing an example of the communication state shown in the flowchart of FIG. 15. More specifically, packet transmission is carried out mutually in the data transfer mode M12 for performing authentication or the like (at timing T21, T22, T23, T24). Then, after the authentication is completed, data (sniff mode request) for shifting to a low power consumption mode is transmitted (at timing T25) from the master (wireless key apparatus 50) and its consent is received (at timing T26) such that both apparatuses are shifted to a low power consumption mode (sniff mode).

Figure 17:
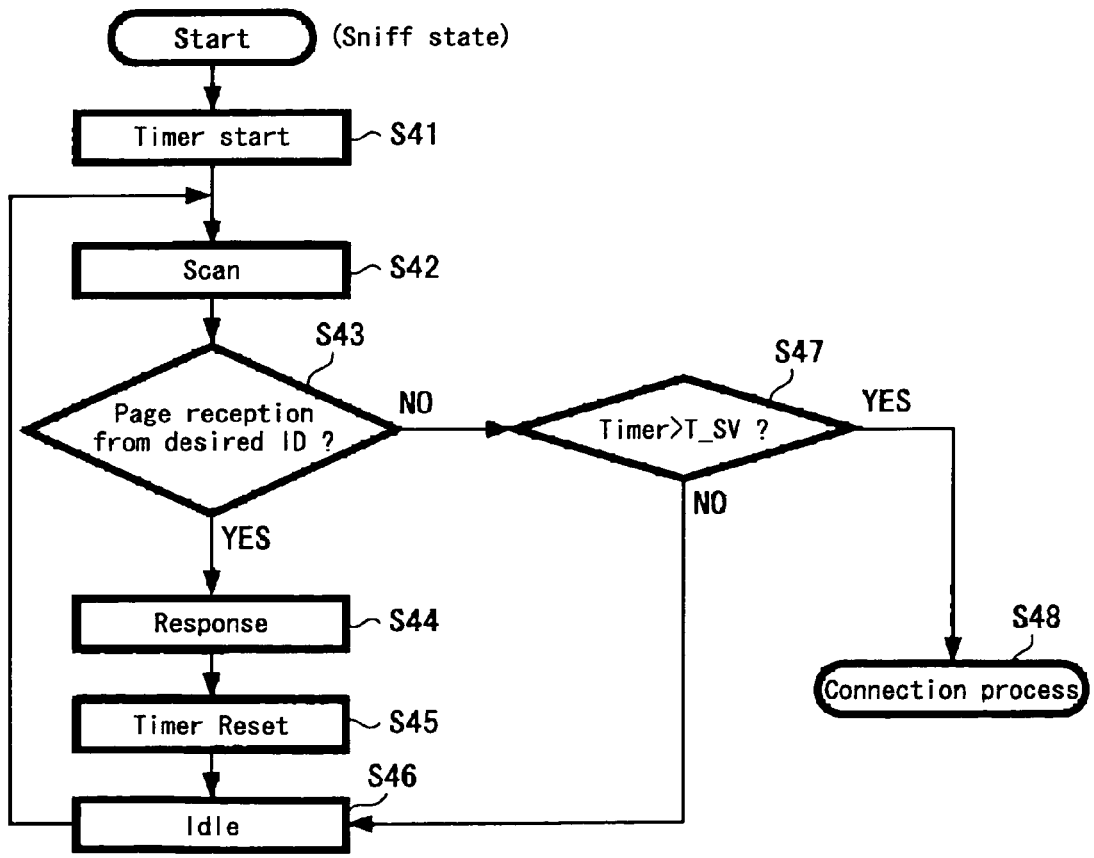
FIG. 17 is a flow chart of a process example in a low power consumption mode.

FIG. 17 is a flowchart showing a process example in a low power consumption mode M13 (sniff mode) relating to the slave (mobile telephone terminal apparatus 10). The process will be explained. When it becomes a sniff mode, first, a timer is started (step S41) and a scan process for receiving a signal from the master is carried out (step S42). It is judged subsequently to the scan process whether or not a signal (page signal) added with the ID number of the wireless key apparatus 50 which is a partner carrying out a security process was received (step S43). Here, in a case when a signal added with the ID number of the wireless key apparatus 50 is received, a response signal with respect to the page signal is transmitted (step S44). Then, the timer started in step S41 is reset (step S45) and it is shifted to an idle period (step S46). When an idle period of a constant period elapses, it returns to the scan process in step S42. Here, in case of the present invention, it is constituted such that the idle period in step S46 (period when communication is not carried out) is set as a relatively longer period and at the same time, it is constituted such that it is synchronized with the idle period on the master side.

On the other hand, in a case when it is judged in step S43 that a signal added with the ID number of the wireless key apparatus 50 is not received, it is judged whether or not the timer started in step S41 exceeded a predetermined value T_SV (step S47). Then, in a case when it does not exceed the predetermined value T_SV, the flow is shifted to the idle process of step S46. Then, in a case when step S47 it is judged it exceeds the predetermined value T_SV, the communication mode is changed to a connection mode M11 (step S48). The transmission power of the transmission amplifier may be changed to be higher when the communication mode is changed to a connection mode.

Figure 18:
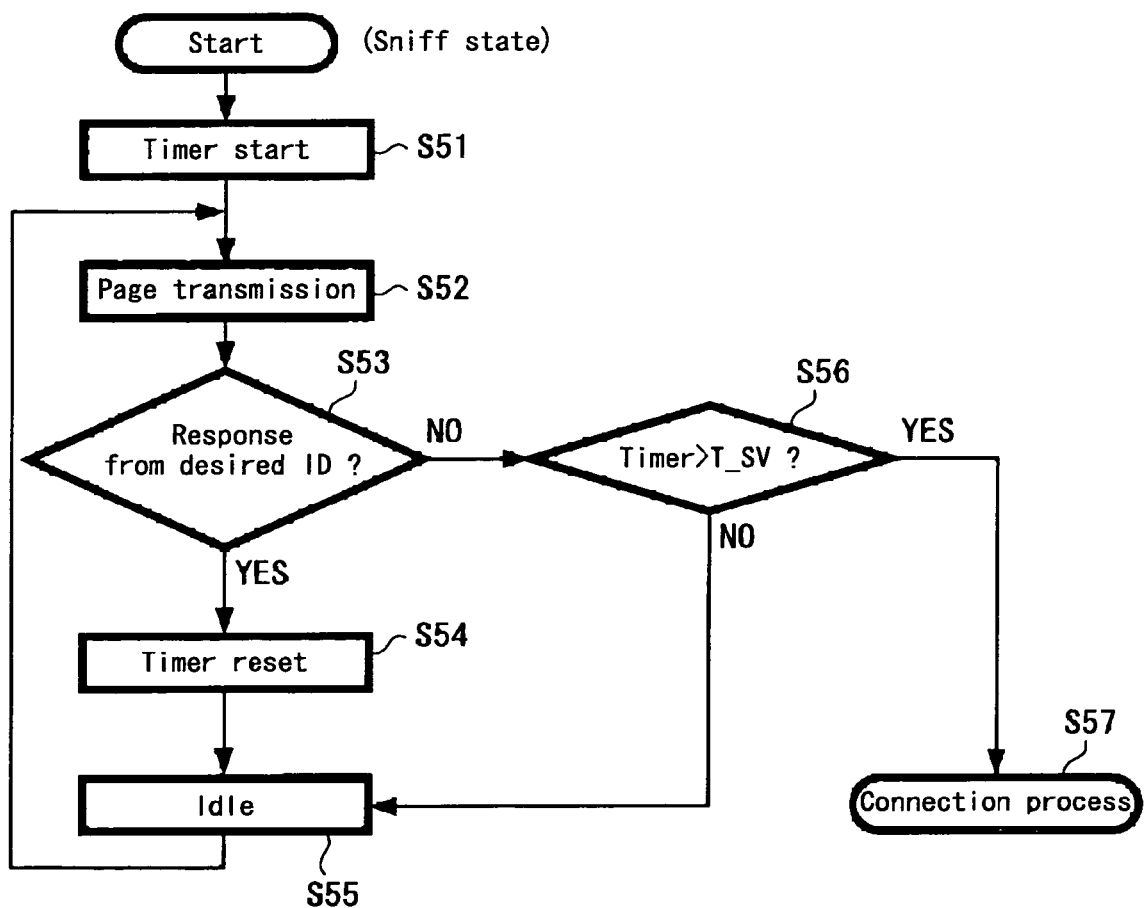
FIG. 18 is a flowchart showing a communication process example in a wireless key apparatus according to one exemplified embodiment of the present invention.

FIG. 18 is a flowchart showing a process example in the master (wireless key apparatus 50) with respect to the low power consumption mode (sniff mode). Its process will be explained. A first timer is started when it becomes a sniff mode (step S51). Then, a process for transmitting a page signal for a predetermined period is carried out (step S52). After the transmission of this page signal, it is judged whether or not a response from a partner (mobile telephone terminal apparatus 10) which carries out a security process was received (step S53). Here, in a case when the response signal is receive, the timer started in step S51 is to be reset (step S54). Then, the flow is shifted to the idle period (step S55). When an idle period of a constant period elapses, the flow returns to the page transmission process of step S52. Here, in case of the present invention, it is constituted such the idle period (period in which the communication is not carried out) in step S55 is to be set as a relatively long period and at the same time is to be synchronized with the idle period on the slave side.

On the other hand, in a case when it is judged in step S53 that a response from the mobile telephone terminal apparatus 10 is not received, it is judged whether or not the timer started in step S51 exceeded a predetermined value T_SV (step S56). In a case when it does not exceed the predetermined value T_SV, it is shifted to the idle process of step S55. Then, in a case when it is judged in step S56 that the predetermined value T_SV is exceeded, the communication mode is changed to a connection mode M11 (step S57). When the communication mode is changed to a connection mode M11, the transmission power of the transmission amplifier may be changed to be high.

Figure 19:
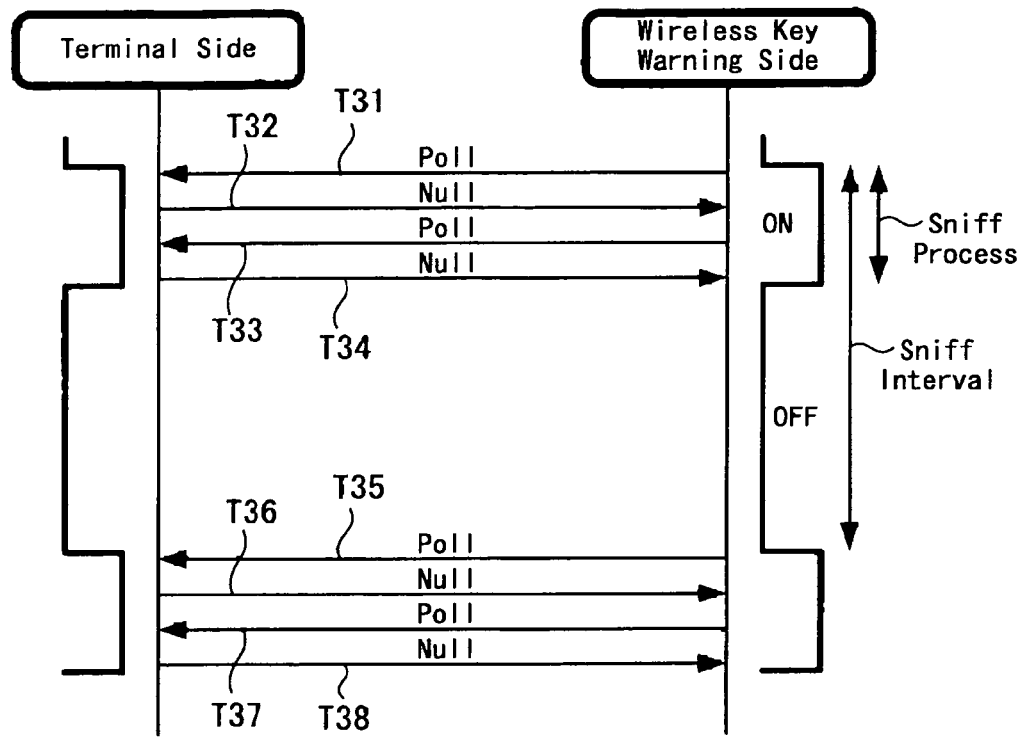
FIG. 19 is a sequence diagram showing a transmission example in a sniff state according to one exemplified embodiment of the present invention.

FIG. 19 is a sequence diagram showing communication timings in the both apparatuses in connection with a low power consumption mode (sniff mode) M13. As shown in FIG. 19, the timing at which the sniff process (portion describes as ON) is carried out in the master and the timing at which the sniff process is carried out in the slave approximately coincide with each other. More specifically, the timings (T31, T33, T35, T37) at which polling packets are transmitted from the master and the periods when the reception thereof are carried out in the slave approximately coincide with each other. Also, respective polling packets are received by the slave and with respect to the responses thereof (at timing T32, T34, T36, T38), they are received on the master side. Owing to the fact that an intermittent bidirectional communication is carried out in this manner, a low power consumption mode M13 is maintained and a wireless connection state between the master and the slave is maintained.

Figure 20:
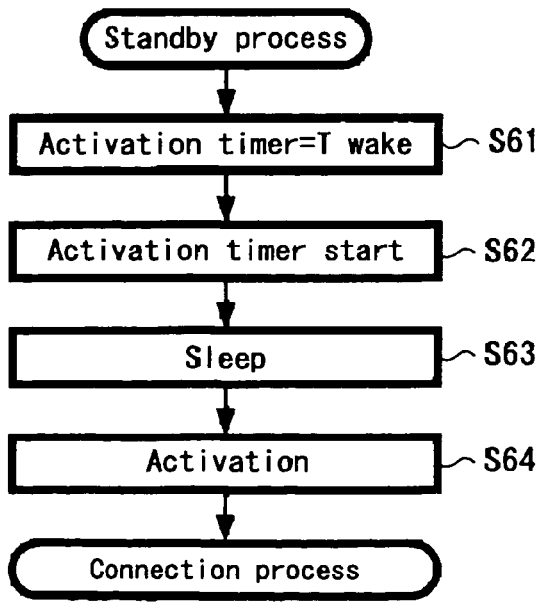
FIG. 20 is a flowchart showing a process example in a standby state according to one exemplified embodiment of the present invention.

It should be noted in a case when the communication mode becomes a standby state that, for example, a process shown in a flowchart of FIG. 20 is carried out. More specifically, when it becomes a standby state, an activation period is set for an activation timer (step S61). Then, the activation timer is started (step S62). Then, the communication circuit is made to be in a sleep state (step S63). Thereafter, when the period set by the activate timer elapses, the communication circuit is activated (step S64) and the step is shifted to the connection mode M11 so as to execute a connection process.

Owing to a fact that the processes explained so far are executed, in a case when the mobile telephone terminal apparatus 10 and the wireless key apparatus 50 can wireless-communicate favorably in an adjacent state, the mobile telephone terminal apparatus 10 and the wireless key apparatus 50 are maintained in a wireless-connected state using a low power consumption mode. In this wireless-connected state using the low power consumption mode, a data transfer which becomes a so-called payload is not carried out and a signal for maintaining the wireless connection is only transmitted and received intermittent. In this case, by selecting the idle period properly, it is possible to carry out a communication with very low power consumption. Therefore, it is possible to lower the power consumption caused by carrying out the security process of the present invention and it is possible to make the battery duration periods of both the mobile telephone terminal apparatus 10 and the wireless key apparatus 50 be a longer period. In particular, there is a big effect on a wireless key apparatus which is desired to be constituted in a small size as much as possible.

Also, with respect to the mobile telephone terminal apparatus 10, a security process was carried out by applying a short distance wireless communication system of the Bluetooth system which has a great number of examples already mounted on mobile telephone terminals, so that the security process of the present invention can be realized only by slightly changing a control constitution or the like of a mobile telephone terminal provided with a short distance wireless communication circuit of an existing Bluetooth system and a favorable security function is realized easily.

Figure 21:
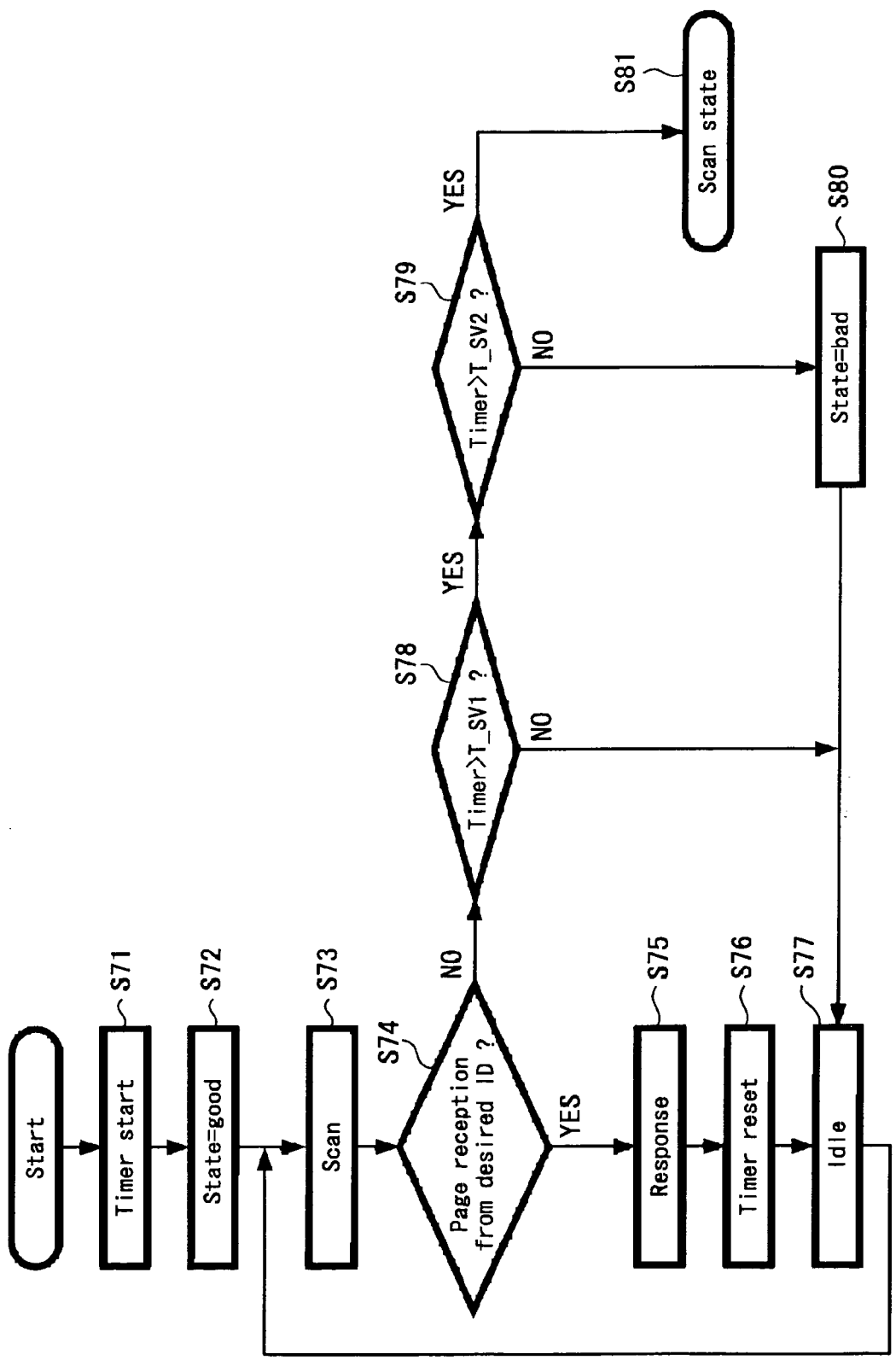
FIG. 21 is a flowchart showing a mode selection process example on a terminal side according to another exemplified embodiment of the present invention.
Figure 22:
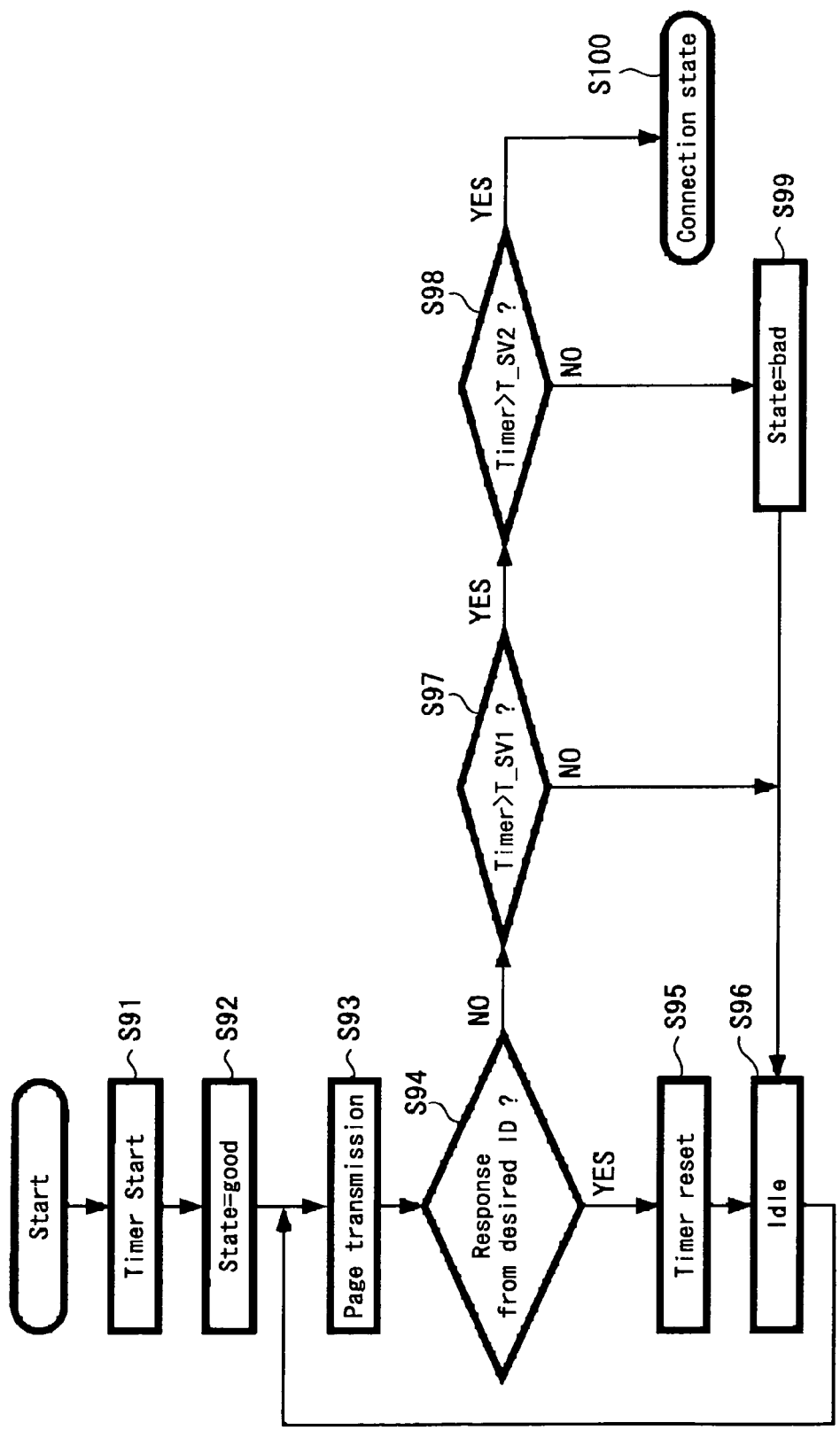
FIG. 22 is a flowchart showing a mode selection process example on a wireless key apparatus side according to another exemplified embodiment of the present invention.
Figure 23:
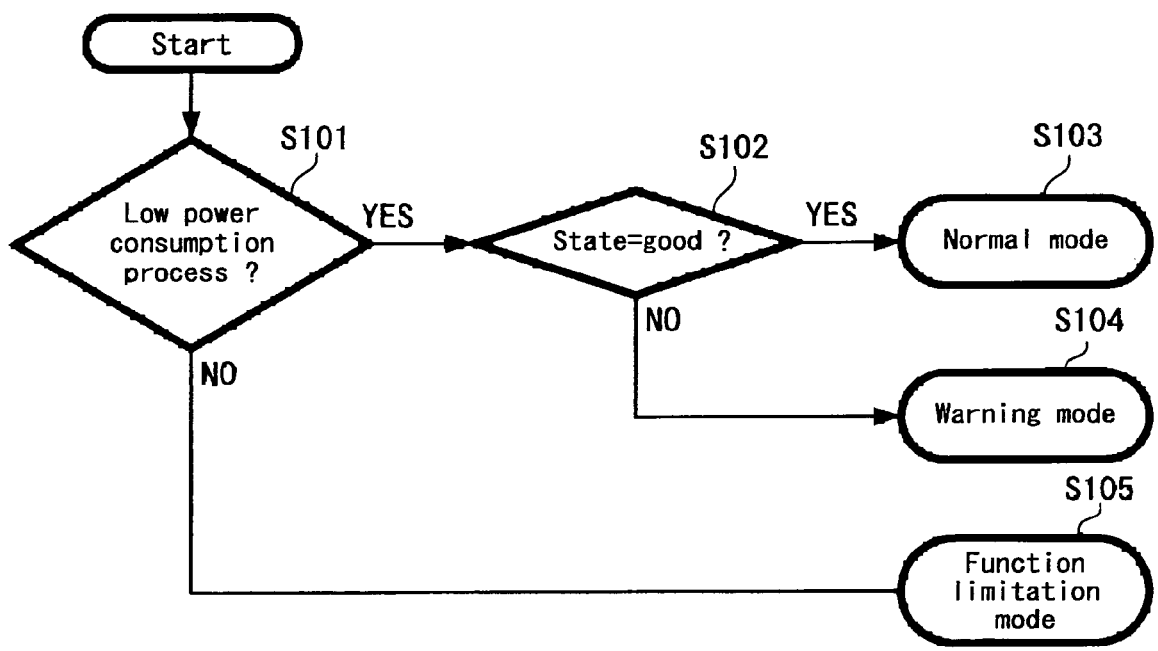
FIG. 23 is a flowchart showing an example of a mode selection state in case of FIGS. 22 and 23.

Here, in the exemplified embodiments mentioned above, it was constituted such that shifting from a low power consumption mode to a connection mode is processed (more specifically, processed according to the connection/cutoff of the communication or the signal strength) simply by whether or not it is a state in which a wireless communication is possible between two apparatuses, but it may be constituted such that it is judged by a detection state of packets from the partner. FIGS. 21 to 23 are diagrams showing a process example in a case thereof.

First, a process example in a slave (mobile telephone terminal apparatus 10) is shown in a flowchart of FIG. 21. When the mobile telephone terminal apparatus 10 becomes in a low power consumption mode (sniff mode), a timer is started (step S71). Then, "good" is set as a communicate state (step S72). Then, a scan process for receiving a signal from a master is carried out (step S73). It is judged in its scan process whether or not a signal (page signal) added with an ID number of the wireless key apparatus 50 which is a partner carrying out a security process was received (step S74). Here, in a case when a signal added with the ID number of the wireless key apparatus 50 was received, a response signal with respect to that page signal is transmitted (step S75) and the timer started in step S71 is reset (step S76). Then, the flow is shifted to an idle period (step S77). When the idle period of a constant period elapses, the flow returns to the scan process of step S73. This idle period is synchronized the idle period on the master side.

In a case when it is judged in step S74 that the signal added with the ID number of the wireless key apparatus 50 cannot be received, it is judged whether or not the timer started in step S71 exceeded a first predetermined value T_SV1 (step S78). In a case when the predetermined value T_SV1 is not exceeded, it is shifted to the idle process of step S77. Then, in a case when it is judged in step S78 that the predetermined value T_SV1 was exceeded, the timer further judges whether or not a second predetermined value T_SV2 was exceeded (step S79). It should be noted that the second predetermined value T_SV2 is a period longer than that of the first predetermined value T_SV1. Here, in a case when it is judged the second predetermined value T_SV2 is not exceeded, "bad" is set as a communicate state (step S80), it is shifted to the idle process of step S77. In a case when it is judged in step S79 that the second predetermined value T_SV2 was exceeded, the communication mode is changed to a connection mode (step S81).

Next, a process example in a master (wireless key apparatus 50) here will be explained with reference to a flowchart of FIG. 22. When it becomes a sniff mode, a first timer is started (step S91). Then, "good" is set as a communicate state (step S92). Then, a process for transmitting a page signal for a predetermined period is carried out (step S93). After the transmission of this page signal, it is judged whether or not a response from the partner (mobile telephone terminal apparatus 10) which carries out a security process was received (step S94). Here, in a case when a response signal was received, the timer started in step S91 is reset (step S95) and the flow is shifted to an idle period (step S96). When an idle period of a constant period elapses, the flow returns to the scan process of step S93. This idle period is synchronized with the idle period on the slave side.

Then, in a case when it is judged in step S94 that a response from the mobile telephone terminal apparatus 10 cannot be received, it is judged whether or not the timer started in step S91 exceeded a first predetermined value T_SV1 (step S97) In a case when the predetermined value T_SV1 is not exceeded, the flow is shifted to an idle process of step S96. Then, in a case when it is judged in step S97 that the predetermined value T_SV1 was exceeded, it is further judged whether or not the timer exceeded a second predetermined value T_SV2 (step S98). It should be noted that the second predetermined value T_SV2 is a period longer than that of the first predetermined value T_SV1. Here, in a case when it is judged that the second predetermined value T_SV2 was not exceeded, "bad" as a communication state is set (step S99). Then the flow is shifted to an idle process of step S96. In a case when it is judged in step S98 that the second predetermined value T_SV2 was exceeded, the communication mode is changed to a connection mode (step S100).

Then, in case of being processed as shown in FIGS. 21 and 22, the security mode selection is to be set according to the judgment as shown in FIG. 23. More specifically, it is judged first whether or not the communication mode is a low power consumption mode (step S101). In case of a low power consumption mode, it is judged whether or not the communicate state set by the flowchart of FIGS. 21 and 22 is "good" (step S102). Here, in a case when the communicate state is "good", the security mode is made to be a normal mode M11 (step S103). Then, in a case when the communicate state is "bad" in step S102, the security mode is made to be a warning mode M2 (step S104). Further, in a case when it is judged in step S101 that it is not a low power consumption mode, the security mode is made to be a function limitation mode M3 (step S105).

By being process as shown in the flowchart of FIG. 23, it becomes a warning mode in a state in which possibility of shifting from the low power consumption mode to the connection mode became high and it is possible to carry out a warning favorably.

Next, it will be explained with respect to an exemplified embodiment in a case when it is constituted when a function limitation is applied to the mobile telephone terminal apparatus 10 such that a transmission power is controlled on the occasion when a reconnection process is carried out between the mobile telephone terminal apparatus 10 and the wireless key apparatus 10.

Figure 24:
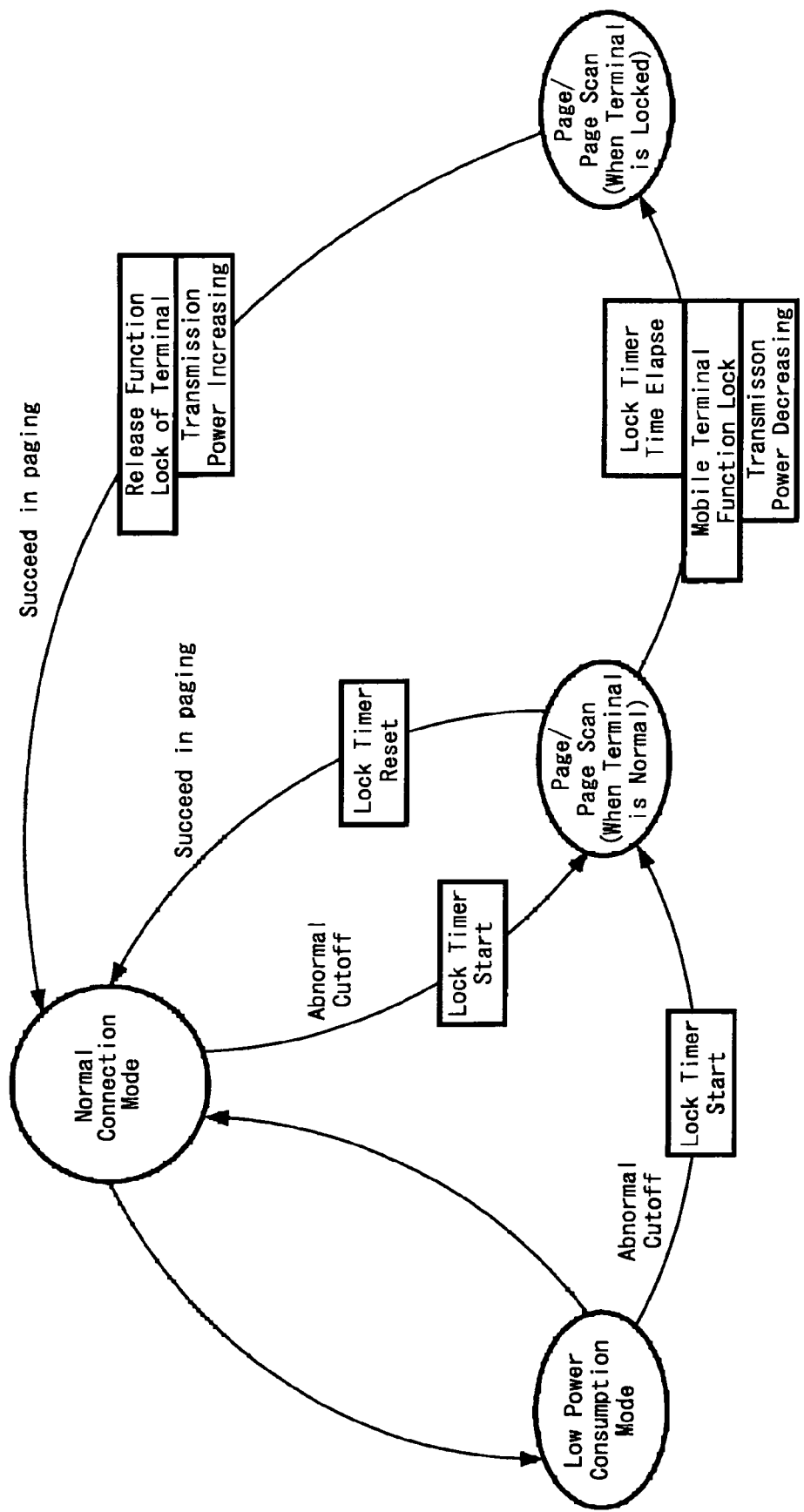
FIG. 24 is a state transition diagram in a terminal function limitation according to one exemplified embodiment of the present invention.

In FIG. 24, there exist four states of "page/page-scan (when the terminal is normal)", "page/page-scan (when the terminal is locked)", "normal connection mode" and "low power consumption mode", and it will be explained with respect to these four states.

The "page/page-scan (terminal normally)" corresponds to a connection mode M11 (FIG. 9 see). In this case, it is still a state in which a function limitation is not applied to the mobile telephone terminal apparatus 10. At that time, the wireless key apparatus 50 executes a transmission process and the mobile telephone terminal apparatus 10 detects a transmission signal from the wireless key apparatus 50 such that it is attempted whether or not the wireless key apparatus 50 and the mobile telephone terminal apparatus 10 are connectable there-between. It is needless to say that it may be constituted such that the side of the mobile telephone terminal apparatus 10 is to carry out the transmission process and the side of the wireless key apparatus 50 is to detect the transmitted signal.

The "page/page-scan (when the terminal is locked)" is a state in which a function limitation is applied to the mobile telephone terminal apparatus 10. At that time, the wireless key apparatus 50 executes a transmission process and the mobile telephone terminal apparatus 10 carries out a detection of the transmission signal such that it is attempted whether or not the wireless key apparatus 50 and the mobile telephone terminal apparatus 10 are connectable there-between. Similarly as mentioned above, it may be constituted such that the side of the mobile telephone terminal apparatus 10 is to carry out the transmission process and the wireless key apparatus 50 is to detect the signal.

The "normal connection mode" corresponds to a data transfer mode M12 (see FIG. 9) or to a transition period from the data transfer mode M12 to the low power consumption communication mode M13. In this case, the authenticity of the connected partner is confirmed and if there is no problem, a process for carrying out a shift to a low power consumption communication process is performed. A state in which a sound telephone call of the mobile telephone terminal apparatus 10 is under an operation or the like lies in this state.

The "low power consumption mode" corresponds to the low power consumption communication mode M13 (see FIG. 9). In this case, an intermittent packet transfer is carried out and it is confirmed whether or not a wireless connection between the wireless key apparatus 50 and the mobile telephone terminal apparatus 10 is maintained.

It will be explained by utilizing aforementioned four states about the function limitation procedure of the mobile telephone terminal apparatus.

<Prerequisite>

0) It is assumed that an arbitrary transmission power is set in the states of "normal connection mode" and "low power consumption mode".

For example, if the mobile telephone terminal apparatus and the wireless key apparatus are away from each other by around 50 m, it is adjusted to take a transmission power such that an abnormal cutoff occurs. At that time, it is not always necessary that both of the mobile telephone terminal apparatus and the wireless key apparatus are set for this transmission power. It is allowed that either one is to be adjusted to this transmission power. Here, it is assumed that the transmission power of the wireless key apparatus side is adjusted.

The distance between the aforementioned mobile telephone terminal apparatus and the wireless key apparatus can be calculated by analyzing a wireless state of a signal received in the communication circuits 32 and 52 for short distance of each apparatus, for example, by analyzing a signal strength or the like in the control units 19 and 53 of each apparatus. Also, by comparing with an initial value under a predetermined condition given beforehand, it can be judged whether the distance between the mobile telephone terminal apparatus and the wireless key apparatus at present is farer or nearer than a predetermined distance.

<Flow after Function Limitation Until Function Limitation Release>

1) In a state of "normal connection mode" or "low power consumption mode", if a user goes away from the mobile telephone terminal apparatus 10 in a state in which a user is carrying the wireless key apparatus 50 and puts only the mobile telephone terminal apparatus 10 somewhere, the communication state becomes deteriorated according to a free space loss or the like. In this case, it becomes difficult to detect the packet which the partner apparatus transmitted and it becomes impossible finally to receive the packet. Then, if the packet cannot be received normally for a certain predetermined time period, the connection between the mobile telephone terminal apparatus 10 and the wireless key apparatus 50 will be cut off for the reason that both of the apparatuses are in a state of connection abnormality or connection failure (abnormal cutoff).

2) Further, when this abnormal cutoff is detected, a lock timer is activated. It is defined in this example such that the lock timer is a time period after the connection abnormality or the connection failure occurs until the function limitation of the mobile telephone terminal apparatus 10 is carried out.

3) Then, it is shifted after the abnormal cutoff to the state of "page/page-scan" and the mobile telephone terminal apparatus 10 or the wireless key apparatus 50 attempts a reconnection (paging).

4) In a case if the paging is successful within the lock timer period, the lock timer is reset and it is shifted to "normal connection mode" so as to repeat the operation from the aforementioned 1).

5) On the other hand, in a case when the paging is not successful within the lock timer period, a function limitation (lock) is applied to the mobile telephone terminal apparatus 10. Further, the transmission power of the wireless key apparatus 50 is lowered. For example, the transmission amplifier 52a is set according to the control of the unit 53 and the transmission power on the side of the wireless key apparatus 50 is lowered until it becomes a transmission power by which a connection cannot be executed unless the distance between the mobile telephone terminal apparatus 10 and the wireless key apparatus 50 is within 1 m.

6) If a user is approaching to the mislaid mobile telephone terminal apparatus and the mobile telephone terminal apparatus 10 and the wireless key apparatus 50 (user) approaches within 1 m, the connection becomes possible again.

7) If the mobile telephone terminal apparatus 10 and the wireless key apparatus 50 succeed in the connection, the step is shifted to "normal mode". The function limitation of the mobile telephone terminal apparatus 10 is to be released. Then, in order to apply the function limitation by 50 m again, the transmission power of the wireless key apparatus 50 is to be increased until it becomes a power with which the function limitation is applied by 50 m.

It may be constituted such that the control of the abovementioned transmission power is carried out only in one of the wireless key apparatus 50 and the mobile telephone terminal apparatus 10 or in both the apparatuses.

According to the above operation, the function limitation is applied at a place far from the user (the wireless key apparatus 50) by a constant distance and the function limitation is not applied in the vicinity of the user. Further, after the function limitation is applied to the mobile telephone terminal apparatus 10 once, the function limitation is not to be released until the mobile telephone terminal apparatus 10 comes to exist in the vicinity of the user. Then, if the user comes to approach to the vicinity thereof and it becomes a distance in which the user can operate the mobile telephone terminal apparatus 10, the function limitation is released automatically, so that it is possible to improve the usability and the reliability of the function limitation function of the mobile telephone terminal apparatus 10.

FIG. 25 is a flowchart showing a transmission power control process of the wireless key apparatus in a state transition shown in FIG. 24. The initial state is a normal connection mode (step S201). In this mode, the authenticity of the connected partner is confirmed and if there is no problem, a process is carried out for shifting to a low power consumption communication process. It becomes this state also during a sound telephone call period or the like. It is judged for a predetermined time whether or not there is a necessary process such as a sound telephone call or the like (step S202) and if there is no necessary process, the step is shifted to a low power consumption mode (step S203).

After shifting to the low power consumption mode, it is judged for a predetermined time whether or not there exists a receiving signal (step S204). If the transmission signal from the mobile telephone terminal apparatus 10 cannot be received normally for a predetermined time for the reason that the mobile telephone terminal apparatus 10 and the wireless key apparatus 50 becomes away or the like, the connection between the mobile telephone terminal apparatus 10 and the wireless key apparatus 50 will be cut off for the reason that it is in a state of connection abnormality or connection failure (abnormal cutoff). At the same time, a lock timer is activated (step S205). Here, it is defined such that the lock timer is a time period after the connection abnormality or the connection failure occurs until the terminal function limitation is carried out.

After the connection abnormality or the connection failure occurs, the step is shifted to a page/page-scan mode (when the terminal is normal) (step S206) and a reconnection with the mobile telephone terminal apparatus 10 is attempted (paging).

Then, it is judged whether or not the paging was successful (step S207). If the paging is successful within the lock timer period and the reconnection with the mobile telephone terminal apparatus 10 can be executed, the lock timer is released (reset) (step S208) and the step is shifted to a normal connection mode of step S201. In a case when the paging failed, it is judged whether or not the time period of the lock timer elapsed (step S209) and if it did not elapse, the flow is shifted to step S207 and the paging is continued.

Then, if the reconnection cannot be attained within the lock timer period after the aforementioned connection abnormality or the connection failure, the wireless key apparatus 50 sets the transmission amplifier 52a and lowers the transmission power (step S210). Then, the flow is shifted to a page/page-scan (when the terminal is locked). For example, the transmission power at that time is made to be a transmission power such that the paging cannot be executed if the distance between the mobile telephone terminal apparatus 10 and the wireless key apparatus 50 is within 1 m.

The reconnection with the mobile telephone terminal apparatus 10 is attempted in a state in which the transmission power of the wireless key apparatus 50 is lowered and is judged whether or not the paging was successful (step S211). The distance between the mobile telephone terminal apparatus 10 and the wireless key apparatus 50 again becomes in the vicinity of a user (in this example, when it becomes within a 1 m region), the mobile telephone terminal apparatus 10 and the wireless key apparatus 50 are reconnected (success of paging). Then, the wireless key apparatus 50 increases the transmission power such that the function limitation can be applied to the mobile telephone terminal apparatus 10 by a distance of 50 m again. Then, the step is shifted to the normal connection mode of step S201 and the abovementioned sequential processes are repeated.

FIG. 26 is a flowchart showing a function limitation control process of the mobile telephone terminal apparatus in the state transition shown in FIG. 24. In FIG. 26, processes from step S221 to S229 corresponds to the processes from step S2011 to S209 in FIG. 25.

In FIG. 26, the initial state is a normal connection mode (step S221). In this mode, the authenticity of the connection partner is confirmed and if there is no problem, a process for shifting to a low power consumption communication process is carried out. It is judged whether or not there is a necessary process such as a sound telephone call or the like for a predetermined time period (step S222) and if there is no necessary process, the step is shifted to a low power consumption mode (step S223).

After shifting to the low power consumption mode, it is judged for a predetermined time period whether or not there exists a receiving signal (step S224). If the transmission signal from the wireless key apparatus 50 cannot be received normally for a predetermined time period owing to a fact that the distance with respect to the mobile telephone terminal apparatus 10 becomes apart or the like, the connection between the mobile telephone terminal apparatus 10 and the wireless key apparatus 50 is cut off for the reason of connection abnormality or connection failure (abnormal cutoff). At the same time, a lock timer is activated (step S225).

After a connection abnormality or a connection failure occurs, the step is shifted to a page/page-scan mode (when the terminal is normal) (step S226) and a reconnection with the wireless key apparatus 50 is attempted (paging).

Then, it is judged whether or not the paging was successful (step S227). If the paging is successful within the lock timer period and a reconnection with the wireless key apparatus 50 can be executed, lock timer is reset (step S228) and the step is shifted to a normal connection mode of step S221. In a case when the paging was failed, it is judged whether or not the lock timer period elapsed (step S229). If it did not elapse, the flow is shifted to step S227 and the paging is continued.

Then, if a reconnection cannot be executed within the lock timer period after the aforementioned connection abnormality or connection failure, a function limitation is applied to the mobile telephone terminal apparatus 10 (step S230). At that time, the transmission power of the wireless key apparatus 50 is lowered as mentioned above to a transmission power, for example, such that the paging cannot be executed if the distance between the mobile telephone terminal apparatus 10 and the wireless key apparatus 50 is not within (step S210 in FIG. 25) and it is shifted to a page/page-scan (terminal lock).

The mobile telephone terminal apparatus 10 attempts the reconnection with the wireless key apparatus 50 in a state in which the transmission power of aforementioned wireless key apparatus 50 is lowered and it is judged whether or not the paging was successful (step S231). If the distance between the mobile telephone terminal apparatus 10 and the wireless key apparatus 50 again becomes in the vicinity a user (in this example, when it becomes within 1 m region), the mobile telephone terminal apparatus 10 and the wireless key apparatus 50 are reconnected (success of paging). Then, the function limitation of the mobile telephone terminal apparatus 10 is released (step S232). At that time, the transmission power is increased on the side of the wireless key apparatus 50 such that a function limitation is to be applied to the mobile telephone terminal apparatus 10 again by a distance of 50 m (step S212 in FIG. 25). Then, the mobile telephone terminal apparatus 10 is shifted to a normal connection mode of step S201 and the abovementioned sequential processes are repeated.

It was shown in FIG. 25 and FIG. 26 with respect to the function limitation and transmission power control processes on an occasion of low power consumption mode and it is needless to say that similar processes are carried out also on an occasion of a normal connection mode in a case when a connection abnormality or a connection failure is detected.

Also, the processes of the function limitation release and the transmission power increase for the mobile telephone terminal apparatus 10 were carried out after the success of the paging, but it is not always necessary to execute this just after the success of the paging and it is possible to carry out the function limitation release of the mobile telephone terminal apparatus 10 when the authentication operation is ended, when it is shifted to a low power consumption or the like.

FIG. 27 a sequence diagram showing a function limitation operation of the mobile telephone terminal apparatus and the wireless key apparatus in this exemplified embodiment. As mentioned above, the transmission power of the wireless key apparatus 50 is adjusted to a transmission power as prerequisite such that a communication cannot be performed if the mobile telephone terminal apparatus 10 and the wireless key apparatus 50 become apart by around 50 m.

First, both the apparatuses of the mobile telephone terminal apparatus 10 and the mobile key apparatus 50 confirm the authenticity of the connected partner each other in a "normal connection mode" communication and if there is no problem, a process for shifting to a low power consumption communication process is carried out. A state in which a sound telephone call is under an operation or the like lies in this state.

In the "low power consumption mode" communication, both the apparatuses carry out transmission and reception of packets intermittently and confirm whether or not the wireless connection is maintained.

Thereafter, if the user carrying the wireless key apparatus 50 goes away from the mobile telephone terminal apparatus 10 and is far from it by around 50 m, the detection of the packet which the partner apparatus transmitted becomes difficult and it becomes impossible to receive the packet finally.

Then, if the packet cannot be received normally for a predetermined time, both the apparatuses of the mobile telephone terminal apparatus 10 and the wireless key apparatus 50 cut off the connection for the reason of a connection abnormality or a connection failure (abnormal cutoff). At the same time, if this connection abnormality or connection failure occurs, both of the apparatuses start respective lock timers.

If the reconnection cannot be executed within the lock timer period even if the reconnection is attempted after the detection of the connection abnormality or the connection failure, a function limitation is applied to the mobile telephone terminal apparatus 10. Further, the transmission power of the wireless key apparatus 50 is lowered to a transmission power by which a connection cannot be attained if, for example, the distance between the mobile telephone terminal apparatus 10 and the wireless key apparatus 50 is not within 1 m. At that time, it is possible to notify to the user by using the speaker 54a or light emitting unit 55 of the wireless key apparatus 50a about a fact that the transmission power was lowered or the mobile telephone terminal apparatus 10 of the connection partner in a lock state.

The mobile telephone terminal apparatus 10 and the wireless key apparatus 50 will try the reconnection also after the function limitation of the mobile telephone terminal apparatus 10 is applied. Then, if the user again approaches to the mobile telephone terminal apparatus 10 and the mobile telephone terminal apparatus 10 and the wireless key apparatus 50 (user) approach within 1 m, the reconnection (paging) becomes successful.

If the reconnection was successful, the function limitation of the mobile telephone terminal apparatus 10 is released. Further, by setting the transmission amplifier 52a of the wireless key apparatus 50, the transmission power is increased until a power by which a function limitation can be applied by 50 m. By repeating the above sequence, the execution and the release of the function limitation in the mobile telephone terminal apparatus 10 are carried out in response to the distance between the mobile telephone terminal apparatus 10 and the wireless key apparatus 50.

As mentioned above, the present invention controls the transmission power in response to the state by utilizing a phenomenon that the communication possible distance between the apparatuses changes according to the amount of the transmission power of the communication apparatus by the Bluetooth system. Specifically, it is constituted with respect to the transmission power on the occasion when processing a connection confirmation between the apparatuses such that the transmission power of at least either one of the communication apparatuses is made smaller relating to the transmission power when the function limitation is released than the transmission power when the function limitation is applied. Further, after the function limitation is released, it is again increased to the original transmission power when the function limitation is applied.

Owing to this fact, the mobile telephone terminal apparatus 10 is applied with a function limitation at a place far from the wireless key apparatus 50 by a constant distance and a function limitation is never applied in an near region (for example, in a distance in which a user can operate the mobile telephone terminal apparatus directly). Further, after the function limitation is applied once, the function limitation is not released until the mobile telephone terminal apparatus 10 comes to exist in a near region and if it becomes a distance in which the user can operate it, it is possible to release the function limitation automatically, so that it is possible to improve the usability and the reliability of security of the function limitation function in the mobile telephone terminal apparatus 10.

Further, according to the present invention, it is possible by lowering the transmission power of the reconnection in a state in which the function limitation is applied to the mobile telephone terminal apparatus 10 to decrease the power consumption compared with that in a case of a conventional transmission using a constant power. Also, in a case when it was constituted such that the transmission power control is carried out in both of the mobile telephone terminal apparatus 10 and the wireless key apparatus 50, it is possible to hold down the power consumption relating to the transmission on the occasion of the function limitation as compared with that in a case when the transmission power control is carried out only on one side.

It should be noted in the above mentioned exemplified embodiment that short distance wireless communication means by Bluetooth system or the like is installed in the mobile telephone terminal apparatus 10 and that short distance wireless communication means is used for actuating the security mode, but it may be constituted, for example, such that the short distance wireless communication means is not to be installed in the mobile telephone terminal apparatus 10 and short distance wireless communication means is to be connected to the mobile telephone terminal apparatus 10 externally. More specifically, it may be constituted, for example, such that two of apparatuses corresponding to the wireless key apparatus are prepared and one of the two wireless key apparatuses is connected to the mobile telephone terminal 10 and the security mode is to be set according to the communication mode in the two of the wireless key apparatuses.

Also, in the exemplified embodiment explained so far, a communication circuit of a Bluetooth system was installed in a mobile telephone terminal such that a wireless communication is to be carried out with the wireless key apparatus by that communication circuit, but it may be constituted such that a wireless communication is to be carried out with the wireless key apparatus by means of another wireless communication system.

Also, in case of the Bluetooth system, one of the apparatus which carry out a communication becomes a master and the other one becomes slave and to make the above mentioned wireless key apparatus side be a master and to make the mobile terminal side be a slave is only one example and it is allowed to reverse the relation there-between. Also, it may be constituted such that the master and the slave are counter-changed on the communication halfway.

Also, in the exemplified embodiment mentioned above, it was applied to the security assuring process of the mobile telephone terminal apparatus, but it may be constituted such that it is applied to a process for assuring the security of other mobile type.

Further, also with respect to the wireless key apparatus, an example which was constituted as a key apparatus for exclusive use was employed in the exemplified embodiment mentioned above, but it may be constituted such that a program which makes if function as a key apparatus of the present invention is installed to a terminal apparatus capable of communicating by the Bluetooth system or the like (for example, PDA apparatus or the like) so as to function as a key apparatus.

Also, the present invention is not limited to above mentioned exemplified embodiments and is applicable to a portable communication terminal other than a mobile telephone terminal apparatus such as, for example, a mobile information terminal (PDA), a mobile type personal computer or the like, and it is needless to say that other various kinds of constitutions can be adapted without departing from the scope of the present invention.

It should be understood by those skilled in the art that various modifications, combinations, sub-combinations and alterations may occur depending on design requirements and other factors insofar as they are within the scope of the appended claims or the equivalents thereof.

The invention claimed is:

1. A communication system comprising:
a communication terminal apparatus; and
a wireless key apparatus, wherein the communication terminal apparatus and the wireless key apparatus are in wireless communication,
said communication terminal apparatus comprising:
a communication unit operable to receive a first wireless signal from the wireless key apparatus, and
a control unit operable to determine a distance between the communication terminal apparatus and the wireless key apparatus based on the received first wireless signal, wherein the control unit limits a predetermined function of the communication terminal apparatus based on the determined distance being longer than a first predetermined distance; and
said wireless key apparatus comprising:
a communication unit operable to receive a second wireless signal from the communication terminal apparatus, and
a control unit operable to determine the distance between the communication terminal apparatus and the wireless key apparatus based on the received second wireless signal, the control unit decreasing transmission power associated with the communication unit based on the determined distance being longer than the predetermined first distance, wherein
the limited predetermined function is released and the transmission power is increased when the distance is determined to be shorter than a second predetermined distance, and wherein the second predetermined distance is less than the first predetermined distance.

2. A communication system according to claim 1, wherein the wireless key apparatus includes a notification unit for notifying that the function of the communication terminal apparatus is limited, the notification unit notifying that the function of the communication terminal apparatus is limited when it is determined that the distance is longer than the first predetermined distance.

3. A communication system according to claim 2, wherein the notification unit stops the notification when the distance is determined to be shorter than the second predetermined distance, and wherein the second predetermined distance is shorter than the first predetermined distance.

4. A communication system according to claim 1, wherein the communication terminal apparatus further comprises another communication unit operable to provide telephone communications by wirelessly communicating with a predetermined base station.

5. A communication system comprising:
a communication terminal apparatus; and
a wireless key apparatus, wherein the communication terminal apparatus and the wireless key apparatus are in wireless communication,
said communication terminal apparatus comprising:
a communication unit operable to receive a first wireless signal from the wireless key apparatus. and
a control unit operable to determine a distance between the communication terminal apparatus and the wireless key apparatus based on the received first wireless signal, wherein the control unit limits a predetermined function of the communication terminal apparatus based on the determined distance being longer than a first predetermined distance; and
said wireless key apparatus comprising:
a communication unit operable to receive a second wireless signal from the communication terminal apparatus, and
a control unit operable to determine the distance between the communication terminal apparatus and the wireless key apparatus based on the received second wireless signal, the control unit decreasing transmission power associated with the communication unit based on the determined distance being longer than the predetermined first distance, wherein
the limited predetermined function is released and the transmission power is increased when the distance is determined to be shorter than a second predetermined distance, wherein the communication terminal apparatus includes a clocking unit for clocking a predetermined time period, the control unit of the communication terminal apparatus operating said clocking unit when the distance is determined to be longer than the first predetermined distance, the control unit limiting the predetermined function when the predetermined time period associated with said clocking unit elapses.

6. A communication terminal apparatus comprising:
a communication unit for transmitting and receiving a wireless signal from a connection partner apparatus; and
a control unit operable to determine a distance between the communication terminal apparatus and the connection partner apparatus based on the received wireless signal, wherein the control unit limits a predetermined function of the communication terminal apparatus based on determining the distance to be longer than a first predetermined distance, the predetermined function being released based on the distance being determined to be shorter than a second predetermined distance, wherein the second predetermined distance is less than the first predetermined distance.

7. A communication terminal apparatus according to claim 6, wherein the communication unit includes a transmission power changing unit operable to control wireless signal transmission power, wherein the control unit reduces the transmission power using the transmission power changing unit such that wireless signal transmission with the connection partner apparatus cannot be provided unless the distance between the communication terminal apparatus and connection partner apparatus is within the second predetermined distance, and when the limiting of the predetermined function is released, the control unit increases the transmission power using the transmission power changing unit such that wireless signal transmission between the communication terminal apparatus and the connection partner apparatus is provided up to the first predetermined distance.

8. A communication terminal apparatus according to claim 6, further comprising another communication unit operable to provide telephone communications by wirelessly communicating with a predetermined base station.

9. A communication terminal apparatus comprising:
a communication unit for transmitting and receiving a wireless signal from a connection partner apparatus;
a transmission power changing unit operable to control wireless signal transmission power at the communication unit;
a control unit operable to determine a distance between the communication terminal apparatus and the connection partner apparatus based on the received wireless signal, wherein the control unit limits a predetermined function of the communication terminal apparatus based on determining the distance to be longer than a first predetermined distance, the control unit reducing the wireless signal transmission power using the transmission power changing unit such that a distance over which the communication terminal apparatus and the connection partner apparatus are capable of wireless communication is within a second predetermined distance, wherein the second predetermined distance is shorter than the first predetermined distance.

10. A wireless key apparatus comprising:
a communication unit for transmitting and receiving a wireless signal from a connection partner apparatus;
a notification unit for notifying that a predetermined function of the connection partner apparatus is limited; and
a control unit operable to control the notification unit when the control unit determines that a distance between the wireless key apparatus and the connection partner apparatus is longer than a first predetermined distance, the control unit further controlling the notification unit in order to stop the notification when the control unit determines that the distance between the wireless key apparatus and the connection partner apparatus is less than a second predetermined distance, wherein the second predetermined distance is shorter than the first predetermined distance.

11. A wireless key apparatus according to claim 10, wherein the communication unit includes a transmission power changing unit operable to control wireless signal transmission power, wherein after the notification was executed, the control unit reduces the transmission power using the transmission power changing unit such that wireless signal transmission with the connection partner apparatus cannot be provided unless the distance between the wireless key apparatus and connection partner apparatus is within the second predetermined distance, and after the notification was stopped, the control unit increases the transmission power using the transmission power changing unit such that wireless signal transmission between the wireless key apparatus and the connection partner apparatus can be provided up to the first predetermined distance.

12. A wireless key apparatus comprising:
a communication unit for transmitting and receiving a wireless signal from a connection partner apparatus;
a notification unit for notifying that a predetermined function of the connection partner apparatus is limited;
a transmission power changing unit for controlling wireless signal transmission power at the communication unit; and
a control unit operable to control the notification unit when the control unit determines that a distance between the wireless key apparatus and the connection partner apparatus is longer than a first predetermined distance, the control unit further controlling the transmission power changing unit in order reduce the transmission power such that wireless signal transmission with said connection partner apparatus cannot be provided unless the distance between the wireless key apparatus and connection partner apparatus is within a second predetermined distance, wherein the second predetermined distance is shorter than the first predetermined distance.

13. A communication system comprising:
a communication terminal apparatus; and
a wireless key apparatus, wherein the communication terminal apparatus and the wireless key apparatus are in wireless communication,
said communication terminal apparatus comprising:
a communication unit operable to perform wireless communication,
a state judgment unit for judging a wireless state of a first wireless signal received by the communication unit from the wireless key apparatus, wherein the judged wireless state corresponds to one of a plurality of connection modes associated with the communication terminal apparatus,
a clocking unit; and
a control unit for limiting a predetermined function based on the judged wireless state; and
said wireless key apparatus comprises:
a communication unit operable to perform wireless communication,
a state judgment unit for judging a wireless state of a wireless signal received by the communication unit from the communication terminal apparatus, wherein the judged wireless state corresponds to one of a plurality of connection modes associated with the wireless key apparatus, and
a transmission power changing unit for changing wireless signal transmission power at the communication unit;
wherein the control unit associated with the communication terminal apparatus limits the predetermined function when it is judged by the state judgment unit of the communication terminal apparatus that the wireless state of the first wireless signal transmitted from the wireless key apparatus at a first transmission power constitutes a connection failure and when a predetermined time period associated with said clocking unit elapses, and wherein the transmission power changing unit associated with the wireless key apparatus adjusts the wireless signal transmission power to a second transmission power which is less than the first transmission power.

14. A communication terminal apparatus comprising:
a communication unit for transmitting and receiving wireless signals from a connection partner apparatus;
a clocking unit;
a state judgment unit for judging a wireless state of a wireless signal received by the communication unit from the connection partner apparatus; and
a control unit for limiting a predetermined function within the communication terminal apparatus when:
it is judged by the state judgment unit that the wireless state of the wireless signal transmitted from the connection partner apparatus at a first transmission power constitutes a connection failure, and
a predetermined time period associated with said clocking unit elapses,
the control unit releasing the limited predetermined function when it is judged by the state judgment unit that the wireless state of the wireless signal transmitted from the connection partner apparatus at a second transmission power smaller than said first transmission power constitutes a successful connection, wherein upon releasing the limited predetermined function within the communication terminal apparatus the second transmission power at the connection partner apparatus is changed back to the first transmission power.

15. A wireless key apparatus comprising:

a communication unit for transmitting and receiving wireless signals from a connection partner apparatus;

a state judgment unit for judging a wireless state of a wireless signal received by the communication unit from the connection partner apparatus;

a notification unit for notifying that a predetermined function of said connection partner apparatus is limited;

a transmission power changing unit for changing wireless signal transmission power at the communication unit; and a control unit operable to control the notification unit when:

it is judged by the state judgment unit that the wireless state of the wireless signal transmitted from said connection partner apparatus at a first transmission power constitutes a connection failure based on exceeding a first predetermined distance between the wireless key apparatus and the connection partner apparatus, and the predetermined function of said connection partner apparatus is limited, the control unit controlling the transmission power changing unit such that the transmission power changing unit reduces the transmission power to a second transmission power, wherein the second transmission power is less than the first transmission power, and when the limited predetermined function is released the transmission power is increased to the first transmission power when the distance is determined to be shorter than a second predetermined distance, wherein the second predetermined distance is less than the first predetermined distance.

16. A communication system comprising a communication terminal apparatus and a wireless key apparatus which can carry out a wireless communication with the communication terminal apparatus by a predetermined wireless communication system, wherein said communication terminal apparatus comprises:

a communication unit for carrying out a wireless communication by said predetermined wireless communication system, a distance judgment unit for judging a distance with respect to said wireless key apparatus, and a control unit for limiting a predetermined function of said communication terminal apparatus according to the distance with respect to said wireless key apparatus;

said wireless key apparatus comprises:

a communication unit for a wireless communication by said predetermined wireless communication system, and a distance judgment unit for judging a distance with respect to said communication terminal apparatus;

at least one of said communication terminal apparatus and said wireless key apparatus comprises a transmission power changing unit for controlling the transmission power of a wireless signal which said communication unit of said one apparatus transmits; and when it is judged by said distance judgment unit that the distance with respect to said wireless key apparatus is longer than a first distance, said control unit of said communication terminal apparatus limits said predetermined function of said communication terminal apparatus and at the same time, said transmission power changing unit changes said transmission power such that the possible communication distance between said communication terminal apparatus and said wireless key apparatus becomes a second distance which is shorter than said first distance, wherein said communication terminal apparatus includes a clocking unit for clocking a predetermined time period, and said control unit of said communication terminal apparatus operates said clocking unit when it is judged by said distance judgment unit that the distance with respect to said wireless key apparatus is longer than said first distance and limits said predetermined function in a case when it is judged by said distance judgment unit that said clocking unit clocks said predetermined time period and the distance with respect to said wireless key apparatus becomes equal or more than said first distance.

* * * * *